United States Patent
Rutland et al.

(10) Patent No.: US 11,124,734 B2
(45) Date of Patent: Sep. 21, 2021

(54) TRACTION DRIVE FLUID

(71) Applicant: Flex-G Pty Ltd, Mawson (AU)

(72) Inventors: Mark Rutland, Sollentuna (SE); Sergei Glavatskih, Stockholm (SE); Shannon Marc Notely, Pearce (AU)

(73) Assignee: Flex-G Pty Ltd, Mawson (AU)

( * ) Notice: Subject to any disclaimer, the term of this patent is extended or adjusted under 35 U.S.C. 154(b) by 0 days.

(21) Appl. No.: 15/769,625

(22) PCT Filed: Oct. 14, 2016

(86) PCT No.: PCT/AU2016/000357
§ 371 (c)(1),
(2) Date: Apr. 19, 2018

(87) PCT Pub. No.: WO2017/063029
PCT Pub. Date: Apr. 20, 2017

(65) Prior Publication Data
US 2019/0292485 A1 Sep. 26, 2019

(30) Foreign Application Priority Data

Oct. 15, 2015 (AU) .............................. 2015904217
Oct. 15, 2015 (AU) .............................. 2015904218
(Continued)

(51) Int. Cl.
*C10M 171/00* (2006.01)
*C10M 171/06* (2006.01)
(Continued)

(52) U.S. Cl.
CPC ........... *C10M 171/002* (2013.01); *B01F 3/12* (2013.01); *B01J 19/10* (2013.01); *B82Y 30/00* (2013.01);
(Continued)

(58) Field of Classification Search
CPC ............ C10M 171/002; C10M 171/06; C10M 2201/041; C10M 2201/066;
(Continued)

(56) References Cited

U.S. PATENT DOCUMENTS 3,966,624 A  6/1976  Duling et al.
6,320,088 B1  11/2001  Matsuno et al.
(Continued)

FOREIGN PATENT DOCUMENTS

CN  102431999 A  5/2012
CN  102728574 B  5/2015
(Continued)

OTHER PUBLICATIONS

Arza et al., "Quantifying Dispersion in Graphene Oxide/Reactive Benzoxazine Monomer Nanocomposites," Macromolecules, 47:3685-3692 (2014).
(Continued)

*Primary Examiner* — Taiwo Oladapo
(74) *Attorney, Agent, or Firm* — Foley Hoag LLP

(57) ABSTRACT

The invention describes a traction drive fluid that comprising a carrier and a particulate solid. The carrier has a boiling point of greater than at least about 100° C., and a melting point of below about 10° C., both being measured at 1 atm pressure. The particulate solid consists of a plurality of laminae. The laminae are homogeneously distributed through the carrier.

12 Claims, 10 Drawing Sheets

(30) Foreign Application Priority Data

Oct. 15, 2015 (AU) ................................ 2015904220
Oct. 15, 2015 (AU) ................................ 2015904221

(51) Int. Cl.

| | |
|---|---|
| *B82Y 30/00* | (2011.01) |
| *C10M 125/02* | (2006.01) |
| *B01J 19/10* | (2006.01) |
| *B01F 3/12* | (2006.01) |
| *C10M 113/02* | (2006.01) |
| *B82Y 40/00* | (2011.01) |
| *H01B 1/24* | (2006.01) |
| *C10N 10/12* | (2006.01) |
| *C10N 20/06* | (2006.01) |
| *C10N 30/02* | (2006.01) |
| *C10N 30/06* | (2006.01) |
| *C10N 30/10* | (2006.01) |
| *C10N 30/12* | (2006.01) |
| *C10N 30/14* | (2006.01) |
| *C10N 30/16* | (2006.01) |
| *C10N 30/18* | (2006.01) |
| *C10N 40/04* | (2006.01) |

(52) U.S. Cl.
CPC ............ *B82Y 40/00* (2013.01); *C10M 113/02* (2013.01); *C10M 125/02* (2013.01); *C10M 171/06* (2013.01); *H01B 1/24* (2013.01); *C10M 2201/041* (2013.01); *C10M 2201/066* (2013.01); *C10M 2209/103* (2013.01); *C10M 2209/104* (2013.01); *C10M 2209/108* (2013.01); *C10M 2209/109* (2013.01); *C10M 2215/042* (2013.01); *C10N 2010/12* (2013.01); *C10N 2020/06* (2013.01); *C10N 2030/02* (2013.01); *C10N 2030/06* (2013.01); *C10N 2030/10* (2013.01); *C10N 2030/12* (2013.01); *C10N 2030/14* (2013.01); *C10N 2030/16* (2013.01); *C10N 2030/18* (2013.01); *C10N 2040/046* (2020.05)

(58) Field of Classification Search
CPC ...... C10M 2209/104; C10M 2209/108; C10M 125/02; C10M 113/02; C10M 2209/103; C10M 2209/109; C10M 2215/042; C10N 2210/06; C10N 2220/082; C10N 2230/02; C10N 2230/06; C10N 2230/10; C10N 2230/12; C10N 2230/14; C10N 2230/16; C10N 2230/18; C10N 2240/046; C10N 2010/12; C10N 2020/06; C10N 2030/02; C10N 2030/06; C10N 2030/10; C10N 2030/12; C10N 2030/14; C10N 2030/16; C10N 2030/18; C10N 2040/046; B82Y 30/00; B82Y 40/00; B01J 19/10; B01F 3/12; H01B 1/24

See application file for complete search history.

(56) References Cited

U.S. PATENT DOCUMENTS

| | | | |
|---|---|---|---|
| 2006/0049081 A1 | 3/2006 | Tsubouchi et al. | |
| 2007/0042915 A1* | 2/2007 | Yoshida ................ | C07C 13/605 508/110 |
| 2007/0057226 A1 | 3/2007 | Forbus | |
| 2008/0206124 A1 | 8/2008 | Jang et al. | |
| 2008/0242566 A1 | 10/2008 | Lockwood et al. | |
| 2010/0044230 A1 | 2/2010 | Papadimitrakopoulos et al. | |
| 2010/0179079 A1* | 7/2010 | Sekiguchi ............ | C10M 105/04 508/110 |
| 2010/0297833 A1 | 11/2010 | Afzali-Ardakani et al. | |
| 2011/0003907 A1 | 1/2011 | Choi et al. | |
| 2011/0030991 A1 | 2/2011 | Veerasamy | |
| 2011/0046027 A1* | 2/2011 | Zhamu ................ | C10M 103/02 508/113 |
| 2012/0259073 A1 | 10/2012 | Ait-Haddou et al. | |
| 2014/0225026 A1 | 8/2014 | Park et al. | |
| 2014/0226429 A1 | 8/2014 | Notley | |
| 2014/0248214 A1 | 9/2014 | Hersam et al. | |
| 2015/0147701 A1 | 5/2015 | Kim et al. | |
| 2015/0279506 A1 | 10/2015 | Wolfrum et al. | |
| 2015/0284253 A1 | 10/2015 | Zhamu et al. | |
| 2016/0137505 A1 | 5/2016 | Nakashima et al. | |
| 2019/0292485 A1 | 9/2019 | Rutland et al. | |

FOREIGN PATENT DOCUMENTS

| | | |
|---|---|---|
| EP | 2395043 A1 | 12/2011 |
| JP | H03137197 A | 6/1991 |
| JP | 2009/242209 A | 10/2009 |
| JP | 2010/095440 A | 4/2010 |
| JP | 2011/513167 A | 4/2011 |
| JP | 2012/153590 A | 8/2012 |
| JP | 2013-035966 A | 2/2013 |
| JP | 2013/155250 A | 8/2013 |
| JP | 2013/530908 A | 8/2013 |
| JP | 2014/529319 A | 11/2014 |
| JP | 2015/059079 A | 3/2015 |
| JP | 2016-069482 A | 5/2016 |
| TW | 201433543 A | 9/2014 |
| WO | WO-2009/106507 A2 | 9/2009 |
| WO | WO-2010/138085 A1 | 12/2010 |
| WO | WO-2011/131722 A1 | 10/2011 |
| WO | WO-2013/010211 A1 | 1/2013 |
| WO | WO-2014/189065 A1 | 11/2014 |
| WO | WO-2017/063024 A9 | 4/2017 |

OTHER PUBLICATIONS

Ciesielski et al., "Graphene via Sonication Assisted Liquid-Phase Exfoliation," Chemical Society Reviews 43(1):381-398 (2014).
Fang et al., "Increased Thermal Conductivity of Eicosane-Based Composite Phase Change Materials in the Presence of Graphene Nanoplatelets," Energy Fuels, 27: 4041-4047 (2013).
Garea et al., "A new strategy for polybenzoxazine-montmorillonite nanocomposites synthesis," Polymer Testing, 28(3): 338-347 (2009).
International Search Report and Written Opinion for International Application No. PCT/AU2016/000352.
International Search Report and Written Opinion for International Application No. PCT/AU2016/000357.
Kim et al., "Sythesis of Phase Transferable Graphense Sheets Using Ionic Liquid Polymers," ACS Nano 4(3):1612-1618 (2010).
Littlejohn et al., "Pressure Sensing and Electronic Amplification with Functionalized Graphite-Silicone Composite," Advanced Functional Materials, 23(43): 5398-5402 (2013).
Quinn et al., "Lipid liquid-crystal phase change induced through near-infrared irradiation of entrained graphene particles," Langmuir, 31(24): 6605-6609 (2015).
Salazar-Rios et al., "Selecting Semiconducting Single-Walled Carbon Nanotubes with Narrow Bandgap Naphthalene Diimide-Based Polymers," Advanced Electronic Materials, Published online, 1(8): 1500074 (2015).
Supplementary European Search Report for EP Application No. 16854628 dated Apr. 3, 2019.
Tanaka et al., "Influence of nanoparticle size to the electrical properties of naphthalenediimide on single-walled carbon nanotube wiring," Nanotechnology, 23(21): 215701 (2012).
Yei et al., "Synthesis of a Novel Benzoxazine Monomer-Intercalated Montmorillonite and the Curing Kinetics of Polybenzoxazine/Clay Hybrid Nanocomposites," Journal of Polymer Science: Part B: Polymer Physics, 44: 347-358 (2006).
Zu et al., "Aqueous Dispersion of Graphene Sheets Stabilized by Pluronic Copolymers: Formation of Supramolecular Hydrogel," Journal of Physical Chemistry C, 113(31):13651-13657 (2009).

(56) References Cited

OTHER PUBLICATIONS

2-Pyrrolidone Properties. Chembook. https://www.chemicalbook.com/ChemicalProductProperty EN CB4453929.htm. As viewed on Sep. 30, 2020. (Year: 2020).
Liang et al., "Dispersion of Graphene Sheets in Organic Solvent Supported by Ionic Interactions," Advanced Materials, 21:1679-1683 (2009).
Machine Translation of CN102431999A. May 2, 2012. (Year: 2012).
Zhang et al., "Effect of Base Oil Structure on Elastohydrodynamic Friction," Tribol Lett, 65(13):1-24 (2017).
Final Rejection for U.S. Appl. No. 15/769,625, "Traction Drive Fluid," dated Apr. 8, 2020.
Non-Final Rejection for U.S. Appl. No. 15/769,625, "Traction Drive Fluid," dated Oct. 20, 2020.

\* cited by examiner

TRACTION DRIVE FLUID

FIELD

This invention relates to a traction drive fluid.

CROSS REFERENCE

The present invention claims priority from Australian provisional application Nos. 2015904217, 2015904220, 2015904221, and 2015904218, the content of all of which are incorporated herein by reference in their entirety.

BACKGROUND

Current traction fluids comprise polycyclic, branched aliphatic organic materials which give these fluids high traction coefficients. The molecular geometry of the materials within these fluids results in a significant increase in viscosity upon the application of the very high pressures found in the thin films formed at the contact zone of a traction drive. The increase in viscosity can be a factor of more than $10^9$, however this is dependent on temperature. Consequently, the effectiveness of these fluids varies with the temperature. The lubricating film behaves elastohydrodynamically, allowing the transmission of torque from a drive element to a driven element. Current traction drive fluids typically have maximum traction coefficients of the order of 0.10 to 0.12, meaning up to about 90% of the available torque in a system is not transferred by such fluids.

There is a need to develop materials that are a viable alternative to traditional traction fluids in which the temperature dependence of the pressure/viscosity relationship is reduced. There is also need to develop traction drive fluids with higher traction coefficients, particularly under reduced contact pressure.

It is an aim of the present invention to at least partially satisfy at least one of the above needs.

SUMMARY OF INVENTION

In a first aspect of the invention there is provided a traction drive fluid comprising: a carrier having a boiling point of at least about 100° C. and a melting point of below about 10° C., both being measured at 1 atm pressure; and a particulate solid consisting of a plurality of laminae, wherein the laminae are homogeneously distributed through said carrier.

The following options may be used in conjunction with the first aspect, either individually or in any suitable combination.

The carrier may have a boiling point of at least about 200° C., measured at 1 atm pressure.

The traction drive fluid may additionally comprise one or more of a corrosion inhibitor, an antimicrobial agent, an antioxidant, a wear inhibitor, a pour point depressant, a metal deactivator, an extreme pressure agent, an antifoam agent, a friction modifier, and a viscosity index improver. It may additionally comprise a dispersant for dispersing the laminae in the carrier. The dispersant may be a polyether, a polyetheramine, an ethoxylated Bisphenol A, an ethoxylated acrylate, a poloxamer, a polyalkylene glycol, or a mixture of any two or more of these.

The laminae may have a mean aspect ratio of at least about 20. The aspect ratio may be defined as the ratio of the minimum non-thickness dimension to the average thickness. The laminae may have average thickness of less than about 50 nm. The laminae may for example comprise graphene.

The proportion of the particulate solid in the traction drive fluid may be from about 0.05% to about 10% w/w. The traction drive fluid may have a traction coefficient of greater than about 0.05 at 25° C., measured at 0.8 GPa contact pressure, 100 mms$^{-1}$ speed, and 10% slide to roll ratio. It may have a pour point of less than about 10° C. This may be measured according to ASTM D 97-16.

In one embodiment there is provided a traction drive fluid comprising: a carrier having a boiling point of greater than about 100° C. and a melting point of below about 10° C., both being measured at 1 atm pressure, a dispersant and a particulate solid consisting of a plurality of laminae, wherein the laminae have a mean aspect ratio of at least about 20, the laminae are homogeneously distributed through the carrier and the proportion of the particulate solid in the traction drive fluid is from about 0.05% to about 10% w/w.

In a second aspect of the invention there is provided a method for transferring torque from a drive element to a driven element, comprising disposing a traction drive fluid between the drive element and the driven element, and rotating the drive element, whereby rotation of the drive element causes rotation of the driven element, wherein the traction drive fluid comprises: a carrier having a boiling point of greater than about 100° C. and a melting point of below about 10° C., both being measured at 1 atm pressure; and a particulate solid consisting of a plurality of laminae, wherein the laminae are homogeneously distributed through said carrier.

The method of the second aspect may use the traction drive fluid of the first aspect. The traction drive fluid of the first aspect may be used in the method of the second aspect.

In a third aspect of the invention there is provided the use of a traction drive fluid in the production or operation of a traction drive, wherein said traction drive fluid comprises: a carrier having a boiling point of greater than about 100° C. and a melting point of below about 10° C., both being measured at 1 atm pressure; and a particulate solid consisting of a plurality of laminae, wherein the laminae are homogeneously distributed through said carrier.

In a fourth aspect of the invention there is provided a traction drive comprising: a drive element; a driven element; and a traction drive fluid, wherein the traction drive fluid is disposed between said drive element and said driven element, wherein the traction drive fluid comprises: a carrier having a boiling point of greater than about 100° C. and a melting point of below about 10° C., both being measured at 1 atm pressure; and a particulate solid consisting of a plurality of laminae, wherein the laminae are homogeneously distributed through said carrier.

The traction drive of the fourth aspect may be produced or operated using the method of the second aspect. The method of the second aspect may be used to produce or operate the traction drive of the fourth aspect.

The traction drive of the fourth aspect may be produced or operated using the traction drive fluid of the first aspect. The traction drive fluid of the first aspect may be used to produce or operate the traction drive of the fourth aspect.

300 is rotated against rotating disc 320 in pot 330. Liquid traction drive fluid sample 310 lubricates the surface of 300 and 320. The coefficient of traction of 310 may be measured at different sample temperatures, slide-to-roll ratios, speeds and contact pressures.

Figure 4:
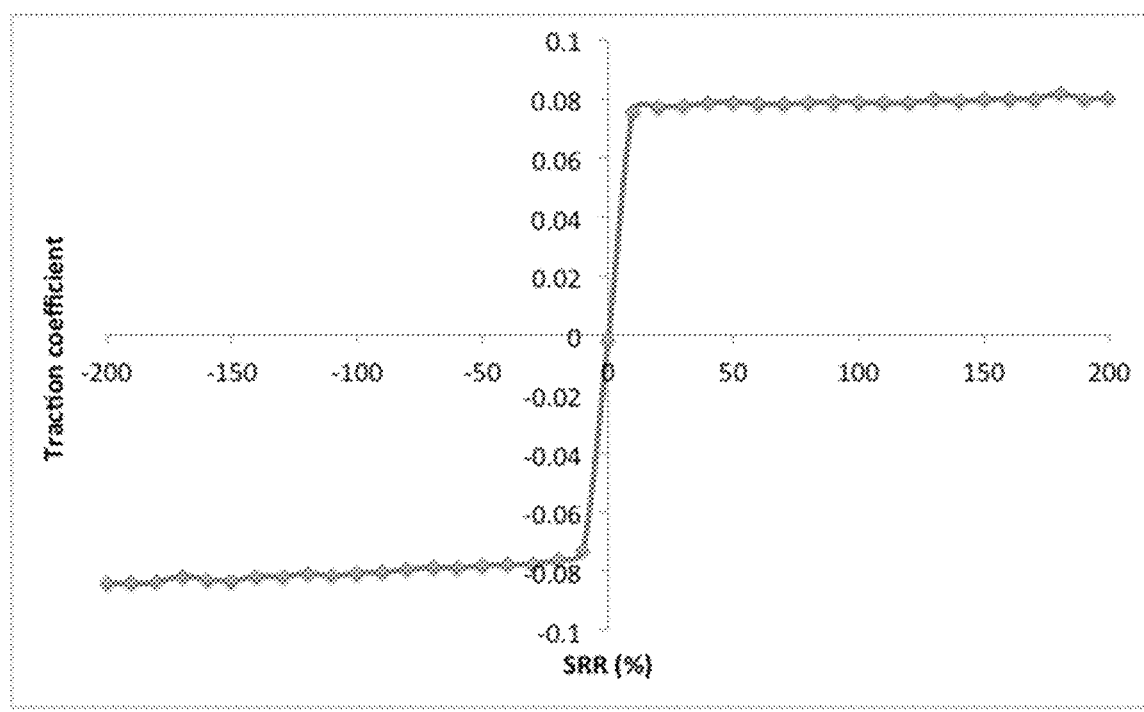

FIG. 4: Observed traction coefficient across a broad slide to roll ratio range for the aqueous based graphene traction fluid formulation. Conditions were load of 45 N (pressure 0.8 GPa), speed of 200 mm/s and temperature of 25° C.

Figure 5:
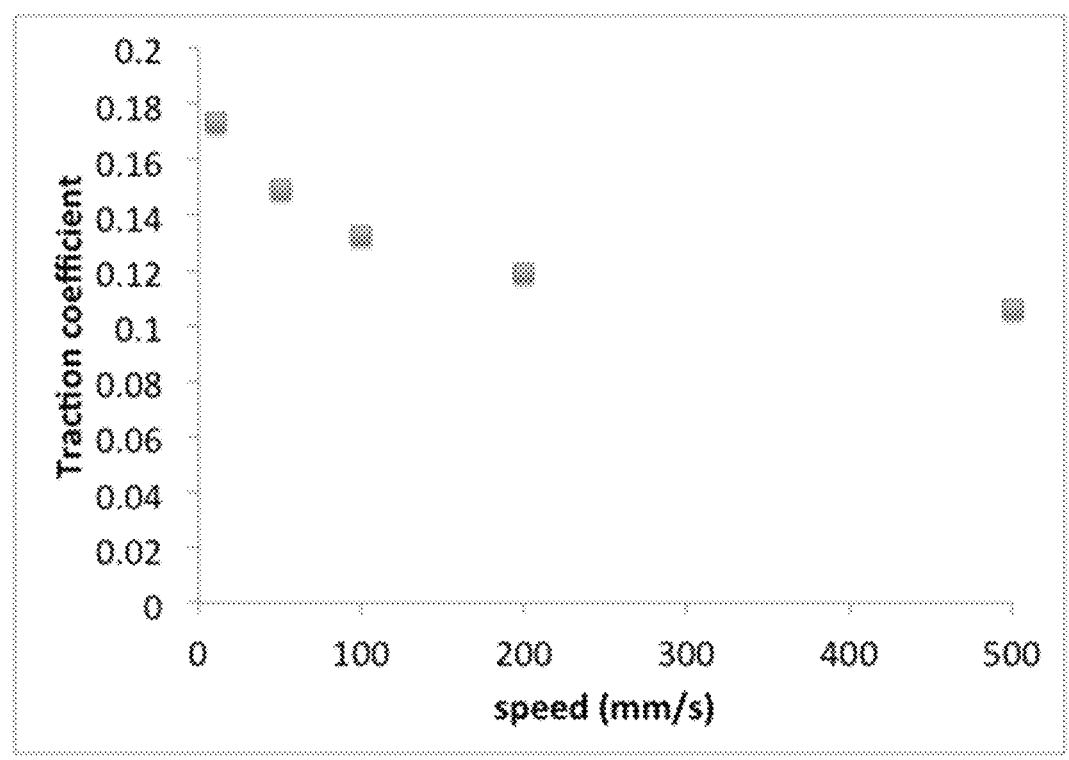

FIG. 5: Traction coefficient of the aqueous carrier fluid based formulation as a function of speed. The applied load was 5N and temperature of the fluid was held constant at 25° C.

Figure 6:
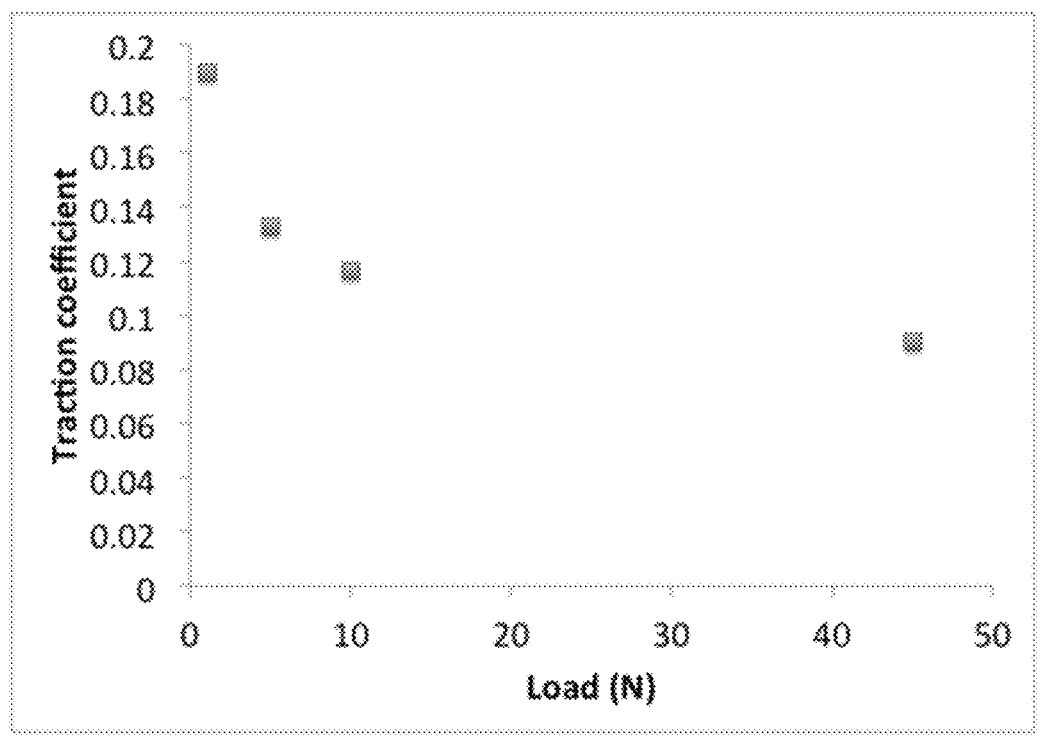

FIG. 6: Traction coefficient of the aqueous carrier fluid based formulation as a function of load. The speed was 100 mm/s and temperature of the fluid was held constant at 25° C.

Figure 7:
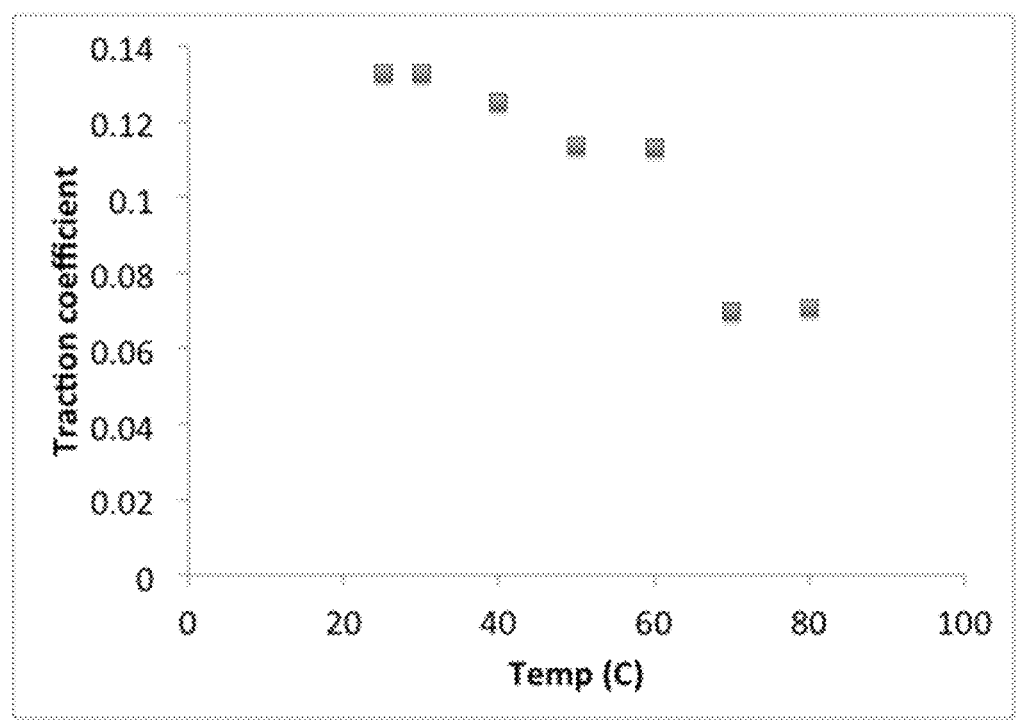

FIG. 7: Traction coefficient of the aqueous carrier fluid based formulation as a function of temperature. The speed used 100 mm/s and the load applied was 5N.

Figure 8:
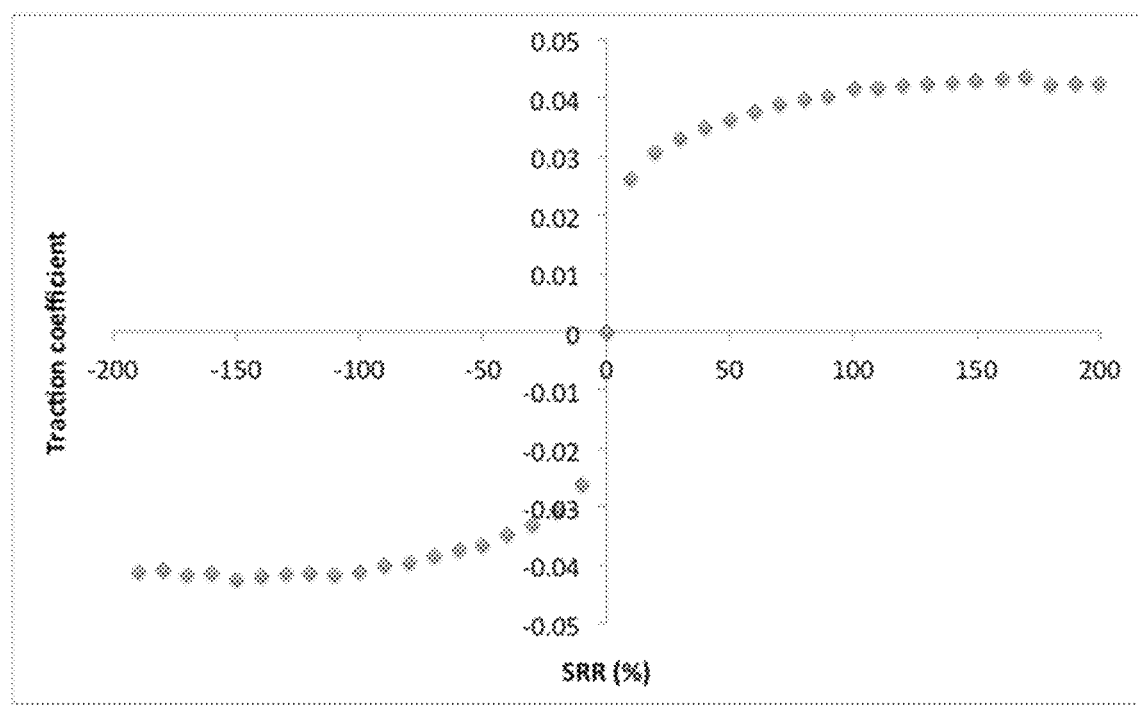

FIG. 8: Observed traction coefficient across a broad slide to roll ratio range for the tetraethylene glycol based graphene traction fluid formulation. Conditions were load of 45 N (pressure 0.8 GPa), speed of 200 mm/s and temperature of 25° C.

Figure 9:
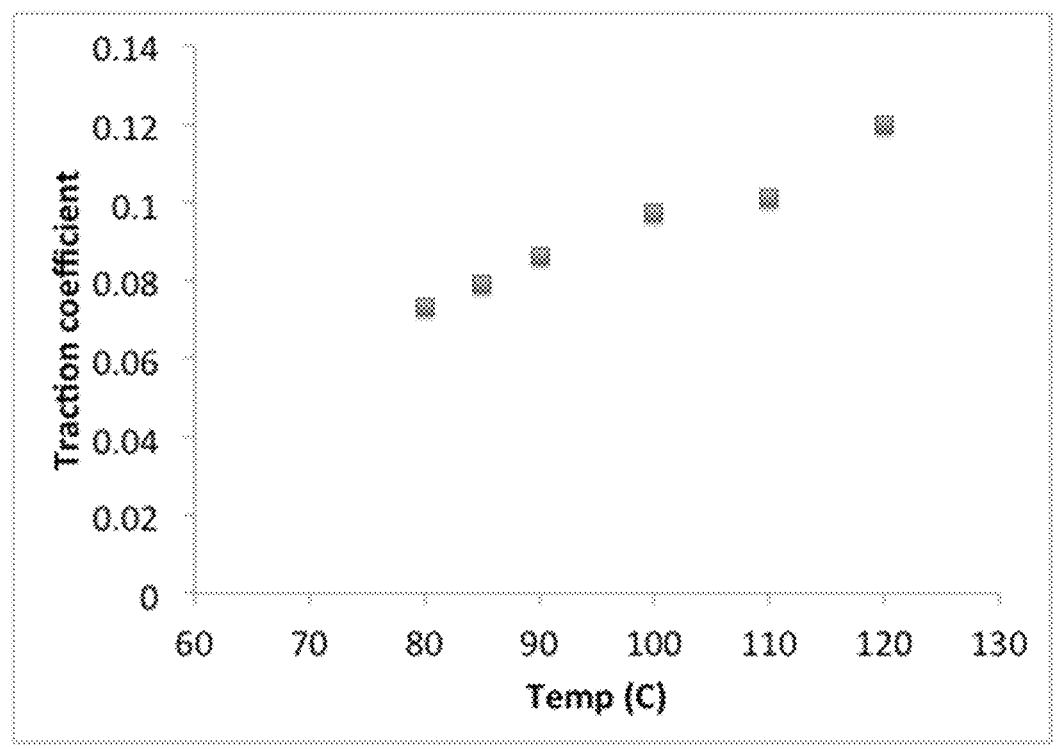

FIG. 9: Traction coefficient of the TEG/PG carrier fluid based formulation as a function of temperature. The speed used 200 mm/s and the load applied was 45N.

Figure 10:
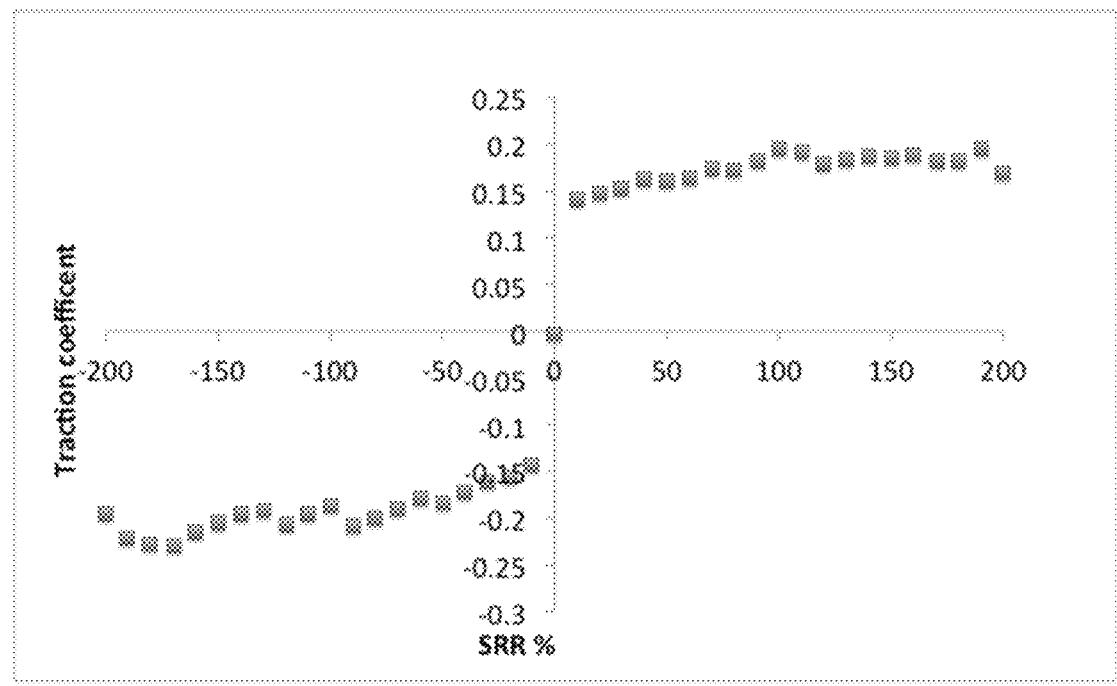

FIG. 10: Observed traction coefficient across a broad slide to roll ratio range for the $MoS_2$ traction fluid formulation in water/ethylene glycol mixture. Conditions were load of 10 N speed of 100 mm/s and temperature of 25° C.

DESCRIPTION OF EMBODIMENTS

In the present specification the following definitions and descriptions apply.

Comprise—this and related terms indicate the presence of the specified integer(s) but allow for the possibility of other integers, unspecified. This term does not imply any particular proportion of the specified integers.

Consist essentially of—this and related terms indicate that the specified integer(s) represent the majority of the components present and that any other integers present are not intentionally present.

Disclosed herein is a traction drive fluid, comprising a carrier and a particulate solid. The carrier has a boiling point of greater than about 100° C. and a melting point of below about 10° C., both being measured at 1 atm pressure. The particulate solid consists of a plurality of laminae. The laminae are homogeneously distributed through the carrier.

The laminae may be an essentially two-dimensional material. In this context two-dimensional means having a non-thickness dimension at least 20 times larger than its average thickness dimension. The shape of these materials may affect elastohydrodynamic contact in a rotational transmission device, for example a traction drive, which may produce a logjam effect in the contact zone between the drive and driven elements. "Elastohydrodynamic" in this context means that the elastic properties of a liquid affect its film formation behaviour under the high pressure forces in the contact zone of a rotational device. "Logjam" in this context means a localised collection, increase in concentration, or buildup of laminar materials in the contact zone during use. This may improve the traction coefficient of the traction drive fluid, and in turn improve the torque transfer within, for example, a traction drive. The choice of laminae may affect the traction properties of the traction drive fluid. The laminae may be a platelet-like material. It may for example be graphene, graphane, graphene oxide, germanene, silicene, phosphorene, molybdenite, boron nitride, germanane, molybdenum disulfide, tungsten diselenide, exfoliated talc, an MXene (being a 2-dimensional metal carbide, nitride or carbonitride), a transition metal dichalcogenide, or it may be a mixture of any two or more of these.

Figure 1:
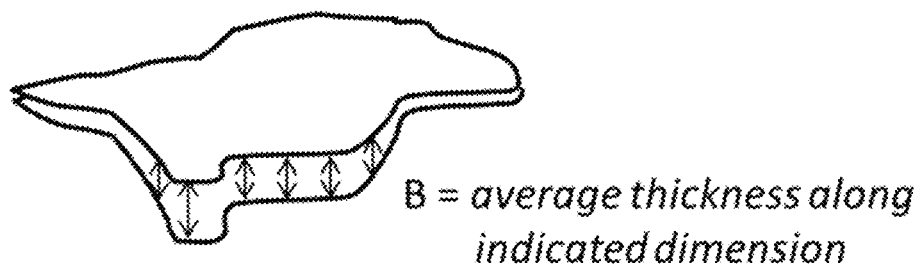
FIG. 1: A depiction of an example lamina.
Figure 1:

The size and shape of the laminae may affect the traction properties of the traction drive fluid. The laminae may have a mean aspect ratio of at least about 20, or at least about 50, 100, 200, 500, 1000, 2000, 5000, $10^4$, or $10^5$. It may be from about 20 to about $10^6$, or from about $10^2$ to $10^6$, $10^3$ to $10^6$, $10^4$ to $10^6$, $10^5$ to $10^6$, 20 to $10^5$, 20 to $10^4$, 20 to $10^3$, 20 to $10^2$, $10^2$ to $10^3$, $10^3$ to $10^4$, or $10^4$ to $10^5$. It may be for example about 20, 30, 40, 50, 100, 200, 500, $10^3$, $5\times10^3$, $10^4$, $5\times10^4$, $10^5$, $5\times10^5$, or $10^6$. The aspect ratio may be defined as the ratio of the minimum non-thickness dimension to the average thickness. The material may be non-uniform in shape, but on average may have non-thickness dimension at least 20 times greater than its average thickness. FIG. 1 outlines how to measure the aspect ratio of a laminar material. In the offset view, B is the average thickness measured across the indicated thickness dimension. In the top view (corresponding to the view when looking directly down upon the upper face depicted in the offset view) the measurement A is the minimum non-thickness width, being the minimum width in the plane of the non-thickness face that passes through the geometrical midpoint of that face (depicted as a dot in the top view depiction). The aspect ratio of the laminar material may be calculated as A/B.

The laminae may have an average thickness of less than about 50 nm, or less than about 20, 10, 5, 2 or 1 nm. It may be from about 0.5 nm to about 50 nm, or from about 1 to 50, 2 to 50, 5 to 50, 10 to 50, 20 to 50, 0.5 to 20, 0.5 to 10, 0.5 to 5, 0.5 to 2, 2 to 5, 5 to 10, or 10 to 20 nm. It may be for example about 0.5, 1, 2, 5, 10, 20 or 50 nm. The laminae may comprise particles formed from a number of sheets of lamina material. The average number of individual sheets in each particle may be 1 or may be greater than about 1, or greater than about 2, 3, 4, 5, 6, 7, 8, 9, 10, 15, 20 or 50 sheets. It may be from about 1 sheet to about 100 sheets, or from about 1 to 50, 1 to 20, 1 to 10, 1 to 5, 5 to 10, 5 to 100, 10 to 100, 20 to 100, 50 to 100, 5 to 10, 10 to 20, or 20 to 50 sheets. It may be for example about 1, 2, 3, 4, 5, 6, 7, 8, 9, 10, 15, 20, 25, 30, 40, 50, 60, 70, 80, 90, or 100 sheets.

The laminae may have an average minimum non-thickness dimension of less than about 2000 μm, or less than about 1000, 500, 200, 100, 50, 20, 10, 5, 2, 1, 0.5, 0.2, or 0.1 μm. It may be from about 0.01 μm to about 2000 μm, or from about 0.01 to 1000, 0.01 to 100, 0.01 to 10, 0.01 to 1, 0.01 to 0.1, 0.1 to 2000, 1 to 2000, 10 to 2000, 100 to 2000, 1000 to 2000, 0.1 to 1, 1 to 10, 10 to 100, 100 to 1000, or 1 to 100 μm. It may be for example about 0.01, 0.02, 0.05, 0.1, 0.2, 0.5, 1, 2, 5, 10, 20, 50, 100, 200, 500, 1000, or 2000 μm.

The choice of carrier may be based on the desired viscosity of the traction drive fluid. It may be based on the desired compatibility with surface materials in contact with the traction drive fluid. It may be based on the desired liquid-state temperature range of the traction drive fluid. The carrier may be able to maintain a desirable viscosity and traction coefficient at high temperatures. It may be able to maintain a desirable viscosity and traction coefficient at high pressures. The carrier may have a boiling point of at least about 100° C., measured at 1 atm pressure, or it may be at least about 110, 120, 150, 200, 210, 220, 250, or 300° C., measured at 1 atm pressure. It may be from about 100° C. to about 500° C., measured at 1 atm pressure, or from about 150 to 500, 200 to 500, 300 to 500, 100 to 200, 100 to 300, 100 to 400, 200 to 300, or 300 to 400° C., measured at 1 atm pressure. It may be for example about 100, 150, 200, 250, 300, 350, 400, 450, or 500° C., measured at 1 atm pressure.

The carrier may have a decomposition temperature of above about 150° C., measured at 1 atm pressure, or above about 200, 300, 400, 500 or 60° C., measured at 1 atm pressure. It may be from about 200° C. to about 1000° C., measured at 1 atm pressure, or from about 400 to 1000, 600 to 1000, 800 to 1000, 200 to 400, 200 to 600, 200 to 800, 400 to 600, or 600 to 800° C., measured at 1 atm pressure. It may be for example about 200, 250, 300, 350, 400, 450, 500, 550, 600, 650, 700, 750, 800, 850, 900, 950, or 1000° C., measured at 1 atm pressure.

The carrier may have a melting point of below about 10° C., measured at 1 atm pressure, or below about 5, 0, −5, −10, or −20° C., measured at 1 atm pressure. It may be from about −100° C. to about 10° C., measured at 1 atm pressure, or from about −100 to 10, −80 to 10, −50 to 10, −20 to 10, 0 to 10, −100 to 0, −100 to −20, −100 to −50, −50 to −20, −20 to −10, or −10 to 0° C., measured at 1 atm pressure. It may be for example about −100, −50, −20, −15, −10, 5, 0, 5, or 10° C., measured at 1 atm pressure.

The carrier may have a pour point (e.g. as measured using ASTM D 97–16) of less than about 10° C., or less than about 0, −10, −20, −50 or −100° C. It may be from about −200° C. to about 10° C., or from about −150 to 10, −100 to 10, −50 to 10, −20 to 10, 0 to 10, −200 to 0, −200 to −20, −200 to −50, −200 to −100, −200 to −150, or −100 to 0° C. It may be for example about −200, −150, −100, −50, −20, −10, 0, or 10° C.

The carrier may be present in the traction drive fluid at a concentration of greater than about 50% w/w, or it may be greater than about 60, 70, 80, 90, or 95% w/w. It may be from about 50% w/w to about 99.5% w/w, or from about 60 to 99.5, 70 to 99.5, 80 to 99.5, 90 to 99.5, 95 to 99.5, 50 to 60, 50 to 70, 50 to 80, 50 to 90, 60 to 80, or 80 to 90% w/w. It may be for example about 50, 55, 60, 65, 70, 75, 80, 85, 90, 95, 97, 99, or 99.5% w/w.

The carrier may act to impart the desired viscosity profile, stability, pour point, liquid phase temperature range and various other rheological properties upon the traction drive fluid. The carrier may comprise a base fluid. It may comprise a base oil. It may comprise a polar solvent. It may comprise a dipolar, aprotic solvent. It may comprise an aliphatic, polycyclic, aromatic, polymeric, oligomeric, or aqueous component, or a mixture of any two or more of these. It may comprise an amide, an alcohol, an amine, an ether, an ester or a mixture of any two or more of these. It may comprise alkylene glycol, alkylene glycol oligomers, or alkylene glycol polymers, or a mixture of any two or more of these. It may comprise a plasticiser, a mineral oil, a synthetic oil, a siloxane or a mixture of any two or more of these. It may comprise a polycyclic, branched aliphatic organic material. It may comprise water. It may comprise no organic components. It may be aqueous. It may for example comprise ethylene glycol, propylene glycol, diethylene glycol, dipropylene glycol, triethylene glycol, tripropylene glycol, tetraethylene glycol, tetrapropylene glycol, polydimethyl siloxane, or any other suitable carrier, or a mixture of any two or more of these.

The traction drive fluid may additionally comprise one or more of a corrosion inhibitor, an antimicrobial agent, an antioxidant, a wear inhibitor, a pour point depressant, a metal deactivator, an extreme pressure agent, an antifoam agent, a friction modifier, and a viscosity index improver. It may additionally comprise a dispersant for dispersing the laminae in the carrier. A component in the traction drive fluid may serve more than one function. For example the dispersant may also act as an antifoam agent.

Corrosion Inhibitor

The corrosion inhibitor may act to decrease the corrosion rate of a material in contact with the traction drive fluid. It may act to decrease the rate of formation of rust in a metal in contact with the traction drive fluid. It may act to decrease the corrosion rate of a material, particularly metal, in contact with the traction drive fluid, when compared to a traction drive fluid without the corrosion inhibitor. The corrosion inhibitor may be an antioxidant. It may act to coat and/or passivate the surface of the material to decrease its corrosion rate. The corrosion inhibitor may be for example a polyphosphate, a benzotriazole derivative, dipotassium phosphate, an organic acid, an organic diacid, an organic ester, an organic diester, a silicate, a silicic acid derivative, a borate ester, or any other suitable corrosion inhibitor, or a mixture of any two or more of these. The choice of corrosion inhibitor may be based on the type of material in contact with the traction drive fluid. The material in contact with the traction drive fluid may be for example any of various metals, including steel; it may be ceramic, rubber, plastic or it may be any other suitable material, or a mixture of any two or more of these. The material in contact with the traction drive fluid may be a coating material, for example diamond-like carbon, an organic material or any another suitable coating material, or a mixture of any two or more such coating materials.

The corrosion inhibitor may be present in the traction drive fluid at a concentration of less than about 5% w/w, or it may be less than about 2, 1, or 0.5% w/w. It may be from about 0% w/w to about 5% w/w, or from about 0 to 0.5, 0 to 1, 0 to 2, 0 to 3, 0 to 4, 0.5 to 5, 1 to 5, 2 to 5, 3 to 5, 4 to 5, 0.5 to 1, 1 to 2, 2 to 3, or 3 to 4% w/w. It may be for example about 0.1, 0.2, 0.5, 1, 1.5, 2, 3, 4, or 5% w/w.

Antimicrobial Agent

The antimicrobial agent may act to reduce or prevent microbial growth occurring in the traction drive fluid. It may act to inhibit microbial growth occurring in the traction drive fluid. It may act to increase the long term stability of the traction drive fluid by reducing microbial growth within the traction drive fluid. It may be an antifungal agent. It may be an antibacterial agent. The antimicrobial agent may be an organic acid, sodium bicarbonate, a triazine, a benzalkonium chloride, or any other suitable antimicrobial agent, or a mixture of any two or more of these.

The antimicrobial agent may be present in the traction drive fluid at a concentration of less than about 5% w/w, or it may be less than about 2, 1, or 0.5% w/w. It may be from about 0% w/w to about 5% w/w, or from about 0 to 0.5, 0 to 1, 0 to 2, 0 to 3, 0 to 4, 0.5 to 5, 1 to 5, 2 to 5, 3 to 5, 4 to 5, 0.5 to 1, 1 to 2, 2 to 3, or 3 to 4% w/w. It may be for example about 0.1, 0.2, 0.5, 1, 1.5, 2, 3, 4, or 5% w/w.

Antioxidant

The antioxidant may act to reduce the rate of oxidation occurring in the traction drive fluid. It may act to inhibit oxidation occurring in the traction drive fluid. It may act to increase the long term stability of the traction drive fluid by reducing oxidation within the traction drive fluid. It may act as a corrosion inhibitor. It may act to decompose radicals within the traction drive fluid. The antioxidant may act to react with free radicals to form non-reactive species within the traction drive fluid. The antioxidant may be a hindered phenol, a hindered amine, a secondary arylamine, a phosphite, a nitrite, a thioester, or any other suitable antioxidant, or a mixture of any two or more of these.

The antioxidant may be present in the traction drive fluid at a concentration of less than about 5% w/w, or it may be less than about 2, 1, or 0.5% w/w. It may be from about 0% w/w to about 5% w/w, or from about 0 to 0.5, 0 to 1, 0 to 2, 0 to 3, 0 to 4, 0.5 to 5, 1 to 5, 2 to 5, 3 to 5, 4 to 5, 0.5 to 1, 1 to 2, 2 to 3, or 3 to 4% w/w. It may be for example about 0.1, 0.2, 0.5, 1, 1.5, 2, 3, 4, or 5% w/w.

Wear Inhibitor

The wear inhibitor may act to coat the surface of a material in contact with the traction drive fluid to protect the surface from coming into contact with any material that might otherwise cause it to wear. The wear inhibitor may be a polyphosphate. It may be a thiophosphate. It may be for example a zinc dialkyldithiophosphate, a zinc dithiophosphate, or any other suitable wear inhibitor, or a mixture of any two or more of these.

The wear inhibitor may be present in the traction drive fluid at a concentration of less than about 5% w/w, or it may be less than about 2, 1, or 0.5% w/w. It may be from about 0% w/w to about 5% w/w, or from about 0 to 0.5, 0 to 1, 0 to 2, 0 to 3, 0 to 4, 0.5 to 5, 1 to 5, 2 to 5, 3 to 5, 4 to 5, 0.5 to 1, 1 to 2, 2 to 3, or 3 to 4% w/w. It may be for example about 0.1, 0.2, 0.5, 1, 1.5, 2, 3, 4, or 5% w/w.

Viscosity Index Improver

The viscosity index improver may act to increase the viscosity of the traction drive fluid at high temperature. It may be a dispersant. It may be a component of the carrier or it may be separate to the carrier. It may be a polymer. It may be an oligomer. It may be for example polyisobutylene, poly(meth)acrylate, an olefin copolymer, a styrene maleic anhydride ester copolymer, a hydrogenated styrene-diene copolymer, a hydrogenated radial polyisoprene polymer, a poloxamer, a polyalkylene glycol, or any other suitable viscosity index improver, or a mixture of any two or more of these.

The viscosity index improver may be present in the traction drive fluid at a concentration of less than about 20% w/w, or it may be less than about 10, 5, 2, 1, or 0.5% w/w. It may be from about 0% w/w to about 20% w/w, or from about 0 to 0.5, 0 to 1, 0 to 2, 0 to 5, 0 to 10, 0.5 to 20, 1 to 20, 2 to 20, 5 to 20, 10 to 20, 0.5 to 1, 1 to 2, 2 to 5, or 5 to 10% w/w. It may be for example about 0.1, 0.2, 0.5, 1, 1.5, 2, 5, 10, 15 or 20% w/w.

Metal Deactivator

The metal deactivator may act to deactivate metal ions that may be introduced into the traction drive fluid through the wearing of metal parts in contact with the traction drive fluid in use. It may act to sequester any metal ions in the traction drive fluid. It may act to inhibit the catalytic effect of metal ions in the traction drive fluid. The metal deactivator may be a metal ion chelating agent. It may be for example N,N-disalicylidene-1,2-propanediamine, ethylenediamine tetraacetic acid, or any other suitable metal deactivator, or a mixture of any two or more of these.

The metal deactivator may be present in the traction drive fluid at a concentration of less than about 5% w/w, or it may be less than about 2, 1, or 0.5% w/w. It may be from about 0% w/w to about 5% w/w, or from about 0 to 0.5, 0 to 1, 0 to 2, 0 to 3, 0 to 4, 0.5 to 5, 1 to 5, 2 to 5, 3 to 5, 4 to 5, 0.5 to 1, 1 to 2, 2 to 3, or 3 to 4% w/w. It may be for example about 0.1, 0.2, 0.5, 1, 1.5, 2, 3, 4, or 5% w/w.

Pour Point Depressant

The pour point depressant may act to lower the pour point of the traction drive fluid. It may act to improve the flow performance of the traction drive fluid at low temperatures. It may act to prevent the formation of crystalline material in the traction drive fluid at low temperatures. The pour point depressant may be for example a poly(meth)acrylate, a styrene ester derivative, or any other suitable pour point depressant, or a mixture of any two or more of these.

The pour point depressant may be present in the traction drive fluid at a concentration of less than about 20% w/w, or it may be less than about 10, 5, 2, 1, or 0.5% w/w. It may be from about 0% w/w to about 20% w/w, or from about 0 to 0.5, 0 to 1, 0 to 2, 0 to 5, 0 to 10, 0.5 to 20, 1 to 20, 2 to 20, 5 to 20, 10 to 20, 0.5 to 1, 1 to 2, 2 to 5, or 5 to 10% w/w. It may be for example about 0.1, 0.2, 0.5, 1, 1.5, 2, 5, 10, 15 or 20% w/w.

Antifoam Agent

The antifoam agent may act to reduce the formation of foam in the traction drive fluid in use. It may act to prevent the formation of foam in the traction drive fluid. The antifoam agent may be for example an alkyl polyacrylate, a silicone oil derivative, an ethylene glycol-propylene glycol copolymer, a fluorosurfactant, polydimethyl siloxane, or any other suitable antifoam agent, or a mixture of any two or more of these.

The antifoam agent may be present in the traction drive fluid at a concentration of less than about 5% w/w, or it may be less than about 2, 1, or 0.5% w/w. It may be from about 0% w/w to about 5% w/w, or from about 0 to 0.5, 0 to 1, 0 to 2, 0 to 3, 0 to 4, 0.5 to 5, 1 to 5, 2 to 5, 3 to 5, 4 to 5, 0.5 to 1, 1 to 2, 2 to 3, or 3 to 4% w/w. It may be for example about 0.1, 0.2, 0.5, 1, 1.5, 2, 3, 4, or 5% w/w. However, in the event that the antifoam agent also functions as a dispersant, it may be present in greater quantity.

Friction Modifier

The friction modifier may act to reduce the surface friction of a surface in contact with the traction drive fluid in use. It may reduce the surface friction of a surface in contact with the traction drive fluid by reacting with and coating the surface. It may be used to tune the surface friction between the traction drive fluid and a surface it is contact with in use. The friction modifier may be for example molybdenum disulfide, zinc dialkyldithiophosphate, or any other suitable friction modifier, or a mixture of any two or more of these. The particulate solid may act as a friction modifier. The friction modifier may be a component of the particulate solid.

The friction modifier may be present in the traction drive fluid at a concentration of less than about 5% w/w, or it may be less than about 2, 1, or 0.5% w/w. It may be from about 0% w/w to about 5% w/w, or from about 0 to 0.5, 0 to 1, 0 to 2, 0 to 3, 0 to 4, 0.5 to 5, 1 to 5, 2 to 5, 3 to 5, 4 to 5, 0.5 to 1, 1 to 2, 2 to 3, or 3 to 4% w/w. It may be for example about 0.1, 0.2, 0.5, 1, 1.5, 2, 3, 4, or 5% w/w.

Extreme Pressure Agent

The extreme pressure agent may act to decrease wear on surfaces exposed to high pressure that are in contact with the traction drive fluid in use. It may react with a surface exposed to the traction drive fluid to form a protective coating on said surface. The extreme pressure agent may be for example an oil-soluble organophosphate, a polysulfide, a molybdenum derivative, a borate ester, an oil soluble borated amine derivative, or any other suitable extreme pressure agent, or a mixture of any two or more of these.

The extreme pressure agent may be present in the traction drive fluid at a concentration of less than about 5% w/w, or it may be less than about 2, 1, or 0.5% w/w. It may be from about 0% w/w to about 5% w/w, or from about 0 to 0.5, 0 to 1, 0 to 2, 0 to 3, 0 to 4, 0.5 to 5, 1 to 5, 2 to 5, 3 to 5, 4 to 5, 0.5 to 1, 1 to 2, 2 to 3, or 3 to 4% w/w. It may be for example about 0.1, 0.2, 0.5, 1, 1.5, 2, 3, 4, or 5% w/w.

Dispersant

The dispersant may act to evenly distribute the laminae throughout the traction drive fluid. In this context, a suitable criterion for an "even" distribution may be that after allowing the traction drive fluid to stand undisturbed for a period of 1 hour, the upper half and the lower half of the composition by volume will each contain within 20%, optionally 10, 5, 2 or 1%, of an equivalent amount of the laminae. The phrase "homogeneously distributed" used throughout may be understood as having an "even" distribution as defined herein. The dispersant may be a surfactant. It may be an anionic surfactant, or it may be a cationic surfactant, or it may be a zwitterionic surfactant, or it may be a non-ionic surfactant. It may be a polymeric surfactant, it may be an oligomeric surfactant, or it may be a monomeric surfactant. It may for example be a polyether, a polyetheramine, an ethoxylated Bisphenol A, an ethoxylated acrylate, a poloxamer, a polyalkylene glycol, or any other suitable dispersant or a mixture of any two or more of these. The choice of dispersant may depend on the nature of the carrier. The choice of dispersant may depend on its solubility properties in the desired temperature range. For example a dispersant may be chosen that is soluble or partially soluble in the carrier at all temperatures within the operational temperature range of the traction drive fluid. The dispersant may perform more than one function in the traction drive fluid. It may, for example, also function as a corrosion inhibitor, or it may also act as a wear inhibitor, or it may also act as an antimicrobial agent, or it may perform another function. Further description of suitable surfactants may be found elsewhere in the specification.

The dispersant may be present in the traction drive fluid at a concentration of less than about 20% w/w, or it may be less than about 10, 5, 2, 1, or 0.5% w/w. It may be from about 0% w/w to about 20% w/w, or from about 0 to 0.5, 0 to 1, 0 to 2, 0 to 5, 0 to 10, 0.5 to 20, 1 to 20, 2 to 20, 5 to 20, 10 to 20, 0.5 to 1, 1 to 2, 2 to 5, or 5 to 10% w/w. It may be for example about 0.1, 0.2, 0.5, 1, 1.5, 2, 5, 10, 15 or 20% w/w.

The proportion of the particulate solid in the traction drive fluid may affect its traction coefficient. A higher proportion of particulate solid in the traction drive fluid may increase the traction coefficient compared with a comparable traction drive fluid with a lower proportion of particulate solid. The proportion of the particulate solid in the traction drive fluid may be from about 0.05% to about 10% w/w, or from about 0.05 to 0.1, 0.05 to 0.2, 0.05 to 0.5, 0.05 to 1, 0.05 to 2, 0.05 to 5, 0.1 to 10, 0.2 to 10, 0.5 to 10, 1 to 10, 2 to 10, 5 to 10, 0.1 to 0.5, 0.5 to 1, 0.5 to 2, or 1 to 5% w/w. It may be for example about 0.05, 0.1, 0.2, 0.3, 0.4, 0.5, 0.6, 0.7, 0.8, 0.9, 1, 2, 3, 4, 5, 6, 7, 8, 9, or 10% w/w.

The traction drive fluid may contain no low boiling point materials. It may contain no materials having boiling point (measured at 1 atm pressure) below about 110° C., or below about 100, 80, 60, or 40° C.

The traction drive fluid may be compatible with, or unreactive to a variety of materials, in particular those with which it is intended to come in contact with in use. It may be compatible with one or more of steel, titanium, copper, Viton, silicone, Teflon, and Buna-N. It may pass the ASTM D 471-16a elastomer compatibility test.

The traction drive fluid may have a traction coefficient (measured at 0.8 GPa contact pressure, 100 mms$^{-1}$ speed, and 10% slide to roll ratio) of greater than about 0.05 at 25° C., or greater than about 0.06, 0.07, 0.08, 0.09 or 0.1 at 25° C. It may be from about 0.05 to about 0.2, or from about 0.05 to 0.07, 0.05 to 0.09, 0.05 to 0.1, 0.05 to 0.12, 0.05 to 0.14, 0.05 to 0.16, 0.05 to 0.18, 0.07 to 0.2, 0.09 to 0.2, 0.1 to 0.2, 0.12 to 0.2, 0.14 to 0.2, 0.16 to 0.2, 0.18 to 0.2, or 0.1 to 0.15 at 25° C. It may be for example about 0.05, 0.07, 0.09, 0.1, 0.11, 0.12, 0.13, 0.14, 0.15, 0.16, 0.17, 0.18, 0.19 or 0.2 at 25° C.

The traction drive fluid may have a traction coefficient (measured at 0.8 GPa contact pressure, 100 mms$^{-1}$ speed, and 10% slide to roll ratio) of greater than about 0.05 at 120° C., or greater than about 0.06, 0.07, 0.08, 0.09 or 0.1 at 120° C. It may be from about 0.05 to about 0.2, or from about 0.05 to 0.07, 0.05 to 0.09, 0.05 to 0.1, 0.05 to 0.12, 0.05 to 0.14, 0.05 to 0.16, 0.05 to 0.18, 0.07 to 0.2, 0.09 to 0.2, 0.1 to 0.2, 0.12 to 0.2, 0.14 to 0.2, 0.16 to 0.2, 0.18 to 0.2, or 0.1 to 0.15 at 120° C. It may be for example about 0.05, 0.07, 0.09, 0.1, 0.11, 0.12, 0.13, 0.14, 0.15, 0.16, 0.17, 0.18, 0.19 or 0.2 at 120° C.

The traction drive fluid may have a traction coefficient (measured at 0.29 GPa contact pressure, 100 mms$^{-1}$ speed, and 10% slide to roll ratio) of greater than about 0.05 at 25° C., or greater than about 0.06, 0.07, 0.08, 0.09 or 0.1 at 25° C. It may be from about 0.05 to about 0.2, or from about 0.05 to 0.07, 0.05 to 0.09, 0.05 to 0.1, 0.05 to 0.12, 0.05 to 0.14, 0.05 to 0.16, 0.05 to 0.18, 0.07 to 0.2, 0.09 to 0.2, 0.1 to 0.2, 0.12 to 0.2, 0.14 to 0.2, 0.16 to 0.2, 0.18 to 0.2, or 0.1 to 0.15 at 25° C. It may be for example about 0.05, 0.07, 0.09, 0.1, 0.11, 0.12, 0.13, 0.14, 0.15, 0.16, 0.17, 0.18, 0.19 or 0.2 at 25° C.

Figure 3:
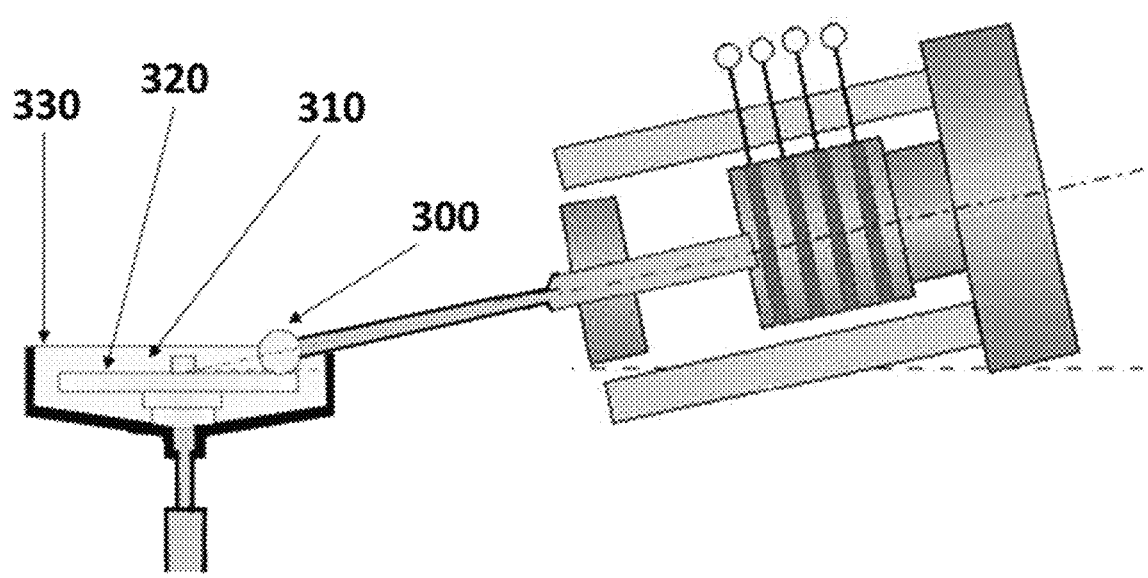
FIG. 3: Schematic diagram of an example apparatus for measuring the traction coefficient in operation. 0.5 inch ball

The traction coefficient may be measured using a standard ball on disk lubrication test system, such as for example a MTM2 Mini Traction Machine from PCS Instruments (see FIG. 3 with associated brief description of drawings for an example schematic diagram of a suitable instrument for measuring the traction coefficient). In this context the slide to roll ratio may be defined as the ratio of the sliding velocity to the rolling velocity of two rolling surfaces with an enforced surface speed difference between them, calculated as follows:

$$\text{slide to roll ratio} = \text{sliding velocity}/\text{rolling velocity} \times 100$$

where sliding velocity=$|U_1-U_2|$ and rolling velocity=$(U_1+U_2)/2$, and where $U_1$ and $U_2$ are the surface velocities of the two contacting surfaces. In this context the speed may be defined as the rolling velocity as hereinbefore defined. In this context the contact pressure may be defined as the pressure applied between the two rolling surfaces, measured at the contact point.

The traction drive fluid may have a pour point (e.g. as measured using ASTM D 97-16) of less than about 10° C., or less than about 0, −10, −20, −50 or −100° C. It may be from about −200° C. to about 10° C., or from about −150 to 10, −100 to 10, −50 to 10, −20 to 10, 0 to 10, −200 to 0, −200 to −20, −200 to −50, −200 to −100, −200 to −150, or −100 to 0° C. It may be for example about −200, −150, −100, −50, −20, −10, 0, or 10° C. The pour point may depend on the concentration of each of the components of the traction drive fluid. The pour point may depend on the concentration of the particulate solid in the traction drive fluid. The pour point may depend on the concentration of the dispersant in the traction drive fluid.

The traction drive fluid may have a surface tension (e.g. as measured using ASTM D971-12) of greater than about 15 mN·m$^{-1}$ at 20° C., or greater than about 20, 25, 30 or 40 mN·m$^{-1}$ at 20° C. It may be from about 15 to about 60 mN·m$^{-1}$ at 20° C., or from about 20 to 60, 30 to 60, 40 to 60, 50 to 60, 15 to 20, 15 to 30, 15, to 40, 15 to 50, or 20 to 40 mN·m$^{-1}$ at 20° C. It may be for example about 15, 20, 25, 30, 35, 40, 45, 50, 55, or 60 mN·m$^{-1}$ at 20° C.

The traction drive fluid may have a flash point (e.g. as measured using ASTM D 92-16) of greater than about 150° C. or greater than about 200, 250, 300, 350, 400, 450 or 500° C. It may be from about 150° C. to about 700° C. or it may be from about 200 to 700, 300 to 700, 400 to 700, 500 to 700, 600 to 700, 150 to 200, 150 to 300, 150 to 400, 150 to 500, 150 to 600, or 300 to 500° C. It may be for example about 150, 200, 250, 300, 350, 400, 450, 500, 550, 600, 650, or 700° C.

The traction drive fluid may have a fire point (e.g. as measured using ASTM D 92-16) of greater than about 150° C. or greater than about 200, 250, 300, 350, 400, 450 or 500° C. It may be from about 150° C. to about 700° C. or it may be from about 200 to 700, 300 to 700, 400 to 700, 500 to 700, 600 to 700, 150 to 200, 150 to 300, 150 to 400, 150 to 500, 150 to 600, or 300 to 500° C. It may be for example about 150, 200, 250, 300, 350, 400, 450, 500, 550, 600, 650, or 700° C.

The traction drive fluid may have an autoignition temperature (e.g. as measured using ASTM E659-15) of greater than about 150° C. or greater than about 200, 250, 300, 350, 400, 450 or 500° C. It may be from about 150° C. to about 700° C. or it may be from about 200 to 700, 300 to 700, 400 to 700, 500 to 700, 600 to 700, 150 to 200, 150 to 300, 150 to 400, 150 to 500, 150 to 600, or 300 to 500° C. It may be for example about 150, 200, 250, 300, 350, 400, 450, 500, 550, 600, 650, or 700° C.

The traction drive fluid may have a dynamic viscosity at 40° C. (e.g. as measured using ASTM D 445-15a) of greater than about 50 mPa·s, or greater than about 80, 100, 120, 150, or 200 mPa·s. It may be from about 50 mPa·s to about 500 mPa·s, or from about 100 to 500, 200 to 500, 300 to 500, 400 to 500, 50 to 100, 50 to 200, 50 to 300, 50 to 400, 100 to 200, 200 to 300, or 300 to 400 mPa·s. It may be for example about 50, 80, 100, 120, 150, 200, 250, 300, 350, 400, 450, or 500 mPa·s.

The traction drive fluid may have a total acid number (in mg KOH/g, e.g. as measured using ASTM D 664-11ae1) of less than about 5, or less than about 2, 1 or 0.5. It may be from about 0 to about 5, or from about 0 to 0.5, 0 to 1, 0 to 2, 2 to 5, 1 to 5, 0.5 to 5, 0.5 to 1, 1 to 2, or 0.5 to 2. It may be for example about 0, 0.2, 0.4, 0.5, 0.6, 0.8, 1, 1.5, 2, 3, 4, or 5.

The traction drive fluid may have shear stability (e.g. as measured using ASTM D 5621-07(2013)) of less than about 15%, or it may be less than about 10, 8, 6, 4, or 2%. It may be from about 0% to about 15%, or it may be from about 0 to 2, 0 to 5, 0 to 10, 0 to 15, 10 to 15, 5 to 15, 2 to 15, or 2 to 10%. It may be for example about 0, 1, 2, 3, 4, 5, 6, 7, 8, 9, 10, 11, 12, 13, 14, or 15%.

The traction drive fluid may have extreme pressure load carrying properties (in kg to fail, e.g. as measured using ASTM D 3233-93(2014)) of greater than about 400, or greater than about 500, 600 or 800. It may be from about 400 to about 1500, or 500 to 1500, 800 to 1500, 1000 to 1500, 1200 to 1500, 400 to 500, 400 to 800, 400 to 1000, 400 to 1200, 500 to 800, 800 to 1000, or 1000 to 1200. It may be for example about 400, 450, 500, 600, 700, 800, 1000, 1200, or 1500.

The traction drive fluid may have an operating temperature range, defined as the operational temperature range of the fluid in the pot or reservoir of a system comprising traction-transferring elements. For example in the system depicted in FIG. 3, this would be the temperature range of the fluid 310 averaged over the pot 330 during operation. The traction drive fluid may have an operating temperature range from about −50° C. to about 300° C., or it may be from about −20 to 300, −10 to 300, 0 to 300, 10 to 300, 20 to 300, −50 to 250, −50 to 200, −50 to 180, −150 to 150, −50 to 100, −20 to 250, −20 to 200, −20 to 180, −20 to 150, −20 to 100, 0 to 250, 0 to 200, 0 to 180, 0 to 150, or 0 to 100° C.

The traction drive fluid may be used in a method for transferring torque from a drive element to a driven element, comprising disposing the traction drive fluid between the drive element and the driven element, and rotating the drive element. In this method the rotation of the drive element may cause the rotation of the driven element.

The space between the drive element and the driven element may comprise a number of further torque-transferring elements that act to transfer the torque between the drive element and the driven element. In this context "torque-transferring" means that an element rotates or acts in some manner to transfer a portion of its torque to an adjacent element, such that the entire system inclusive of the drive, driven and torque-transferring elements between act with the traction drive fluid to ultimately transfer a portion of torque from the drive element to the driven element. Each of these torque-transferring elements may themselves rotate as the drive element is rotated. The point of closest proximity between each adjacent torque-transferring element in the system (inclusive of the drive and driven elements) may be a space of less than about 5 mm, or less than about 1, 0.1, $10^{-2}$ $10^{-3}$, $10^{-4}$ or $10^{-5}$ mm. It may be from about $10^{-6}$ mm to about 5 mm, or from about $10^{-6}$ to 1, $10^{-6}$ to 0.1, $10^{-6}$ to $10^{-2}$, $10^{-6}$ to $10^{-3}$, $10^{-6}$ to $10^{-4}$, $10^{-6}$ to $10^{-5}$, $10^{-5}$ to 5, $10^{-4}$ to 5, $10^{-3}$ to 5, $10^{-2}$ to 5, 0.1 to 5, 1 to 5, $10^{-5}$ to $10^{-4}$, $10^{-4}$ to $10^{-3}$, $10^{-3}$ to $10^{-2}$, $10^{-2}$ to 0.1, or 0.1 to 1 mm. It may be from example about $10^{-6}$, $5\times10^{-6}$, $10^{-5}$, $5\times10^{-5}$, $10^{-4}$, $5\times10^{-4}$, $10^{-3}$, $5\times10^{-3}$, $10^{-2}$, $5\times10^{-2}$, 0.1, 0.2, 0.3, 0.4, 0.5, 0.6, 0.7, 0.8, 0.9, 1, 1.2, 1.4, 1.5, 1.6, 1.8, 2, 2.5, 3, 3.5, 4, 4.5, or 5 mm. The gap may be sufficiently small as to allow torque transfer between the elements when the gap is filled with the traction fluid. The skilled person will appreciate suitable gap sizes based on the viscosity, film forming ability and other rheological properties of the traction drive fluid. The gap may be smaller when the adjacent torque-transferring elements are acting under load (i.e. when they are acting to transfer torque in the system) when compared to when the elements are at rest. The maximum lateral dimension of the laminae may be chosen to be smaller than the gap size in use. It may be less than about 50% of the gap size in use, or less than about 40, 30, 20 or 10% thereof. The traction drive fluid may fill the gap at the point of closest proximity between each adjacent torque-transferring element in the system. The traction drive fluid may form a thin film that fills the space at the point of closest proximity between each adjacent torque-transferring element in the system. The traction drive fluid may act to transfer torque between each adjacent torque-transferring element in the system.

Figure 2:
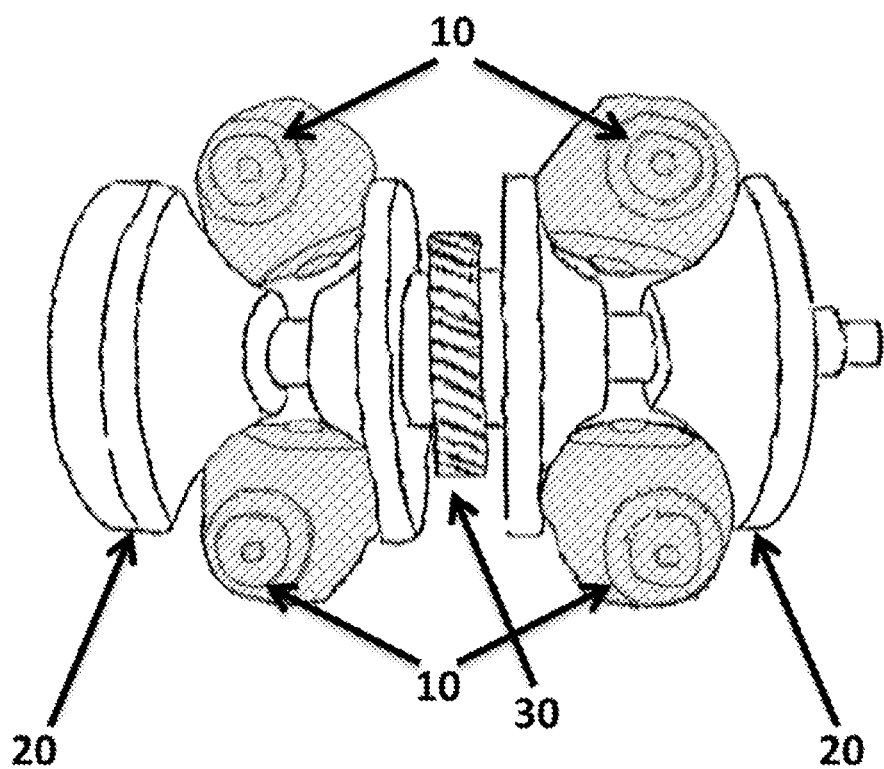
FIG. 2: An example traction drive component of an automotive continuous variable transmission.

The traction drive fluid may be used in the production or operation of a traction drive. It may be used as a component in a car, bus, tractor, lawn mower, heavy machinery, jet ski, snowmobile, kinetic energy recovery system, a supercharger, or as a component in any other suitable machine. The traction drive may for example be used as a component in a continuously variable transmission as depicted in FIG. 2. The power rollers 10 rotate in the toroidal space between the input drive element 20 and the output driven element 30 in use as 20 is rotated. The power roller position can be varied to adjust the speed of the output driven element 30. The traction drive fluid of the invention may act to lubricate the surfaces between 20 and 10, and between 10 and 30, and to transfer torque from 20 to 10 and from 10 to 30.

The traction drive fluid may be relatively insensitive to pressure. That is, it may retain a high traction coefficient at low contact pressure. In other words it may retain a high traction coefficient even in the case where thicker lubricating films of the fluid are formed between adjacent traction transferring elements in a system in use, when compared to the case where the same traction drive fluid forms a thin lubricating film between the adjacent traction transferring elements in use. A thick lubricating film between adjacent traction transferring elements may be formed through application of a low contact pressure between the elements. A thin lubricating film between adjacent traction transferring elements may be formed through application of a high contact pressure between the elements. It may be used in the production of more efficient traction drives, or traction drives that exhibit reduced wear, through being able to be operated at reduced contact pressure.

The traction drive fluid may be prepared using a number of methods, including but not limited to those set out below. It should be understood that the ratio of components combined in the method should be sufficient to prepare the traction drive fluid as hereinbefore described.

A first method comprises combining a plurality of discrete laminae with a carrier, both laminae and carrier as hereinbefore described. In this context "discrete" refers to laminae which are not aggregated e.g. graphene rather than graphite. The laminae may be in a solid form. They may be in a freeze dried form. They may be in a dispersion. They may be in a suspension. They may be a product of exfoliation of a laminar material such as graphite, talc etc.

The method may additionally comprise the step of adding one or more of the corrosion inhibitor, the antioxidant, the wear inhibitor, the pour point depressant, the metal deactivator, the extreme pressure agent, the antifoam agent, the friction modifier, and the viscosity index improver as hereinbefore described to the mixture. The method may additionally comprise the step of adding the dispersant as hereinbefore described.

A second method comprises: a) combining a dispersion of laminae in water with a non-aqueous medium to provide a mixture comprising the non-aqueous medium, water and the laminae, and optionally b) partially, or fully removing the water from the mixture.

The non-aqueous medium may be the carrier as hereinbefore described. The carrier as hereinbefore described may comprise the non-aqueous medium, in which case the method may additionally comprise the step of adding the remaining portion of the carrier to the mixture. The carrier as hereinbefore described may be separate to the non-aqueous medium, in which case the method may additionally comprise the step of removing the non-aqueous medium from the mixture and adding the carrier to the mixture.

The method may additionally comprise adding one or more of the corrosion inhibitor, the antimicrobial agent, the antioxidant, the wear inhibitor, the pour point depressant, the metal deactivator, the extreme pressure agent, the antifoam agent, the friction modifier, and the viscosity index improver as hereinbefore described to the mixture.

The non-aqueous medium may comprise the dispersant as hereinbefore described. The non-aqueous medium may not comprise the dispersant, in which case the method may additionally comprise the step of adding the dispersant for dispersing the laminae in the carrier.

The laminae may have a complete monolayer of a surfactant on the surface thereof. The surfactant may be the dispersant as hereinbefore described. It may be separate to the dispersant. The surfactant may be a polymeric surfactant. It may be non-ionic. The dispersion of laminae in water may comprise a salt capable of complexing or otherwise interacting with said the surfactant. The salt may be a salt of a multivalent cation. It may be a ferric salt, e.g. ferric chloride. The method may comprise adding said salt to the water prior to step a).

The method may comprise the step of exfoliating a laminar material (e.g. graphite) in water so as to prepare the dispersion of laminae (e.g. graphene) in water. The step of exfoliating may comprise ultrasonicating the laminar material in an aqueous solution of a surfactant for sufficient time to form the laminae in the solution. The ultrasonication may be such that, at all times during the ultrasonication, the concentration of the surfactant in the solution is maintained sufficient to form a complete monolayer on the surfaces of the laminar material and the laminae in the solution.

The non-aqueous medium may have a lower vapour pressure than water. In this event, step b) may comprise evaporating, or partially evaporating the water from the mixture so as to leave the dispersion of laminae in the non-aqueous medium. Suitable non-aqueous media include benzyl alcohol, glycol ethers, reactive amines and dipolar aprotic solvents as well as mixtures of any two or more thereof. The non-aqueous medium may be miscible with water. Step a) may also involve agitating the dispersion with the non-aqueous medium. The non-aqueous medium may be a liquid at 25° C.

The non-aqueous medium may be immiscible with water. In this event step a) may comprise agitating the dispersion with the non-aqueous medium, and step b) may comprise allowing the mixture to separate and separating the water from the dispersion of the laminae in the non-aqueous medium. Suitable non-aqueous media include halogenated media and mixtures thereof. If the non-aqueous medium is immiscible with water, it may be a liquid at some temperature between about 0 and about 100° C., commonly at some temperature between about 20 and about 50° C.

The method may additionally comprise adding an azeotroping liquid to the dispersion of the laminae in the non-aqueous medium, said azeotroping liquid forming an azeotrope with water and said azeotrope having a higher vapor pressure than the non-aqueous medium, and then evaporating the azeotrope from the dispersion (e.g. boiling the azeotrope off from the dispersion).

The method may additionally comprise exposing the dispersion of the laminae in the non-aqueous medium to a solid drying agent, and separating the solid drying agent from said dispersion. Commonly this will be done at a temperature at which the non-aqueous medium is a liquid. The solid drying agent may be for example a zeolite. It may have sufficiently large particle size as to be removable without removing substantial amounts of the laminae. It may be separable by sedimentation or by flotation in the dispersion of the laminae in the non-aqueous medium.

In this context, a dispersion may be considered to refer to solid particles dispersed through a medium. The solid particles may be dispersed substantially homogeneously. The dispersion may be a suspension. It may be a liquid dispersion or may be a solid dispersion. It may be stable. It may be sufficiently stable that, if it is agitated so as to achieve substantial homogeneity and then allowed to stand undisturbed at 25° C., it remains substantially homogeneous for 1 hour, or for 1 day, or for one week, or for 1 month. "Substantially homogeneous" should be taken to indicate that the content of the upper 50% by volume of the dispersion contains between 45% and 55%, optionally between 49% and 51% or between 49.5 and 50.5% by volume, of the solid particles. It will be understood that, in the event that the dispersion is a solid dispersion, it is likely to be nearly indefinitely stable, since the presence of a solid matrix of the non-aqueous medium would prevent, or at least strongly inhibit, separation of the dispersed particles.

The term "non-aqueous medium" refers to a substance that is capable of having the laminae dispersed therein. It may be liquid at some temperature between about 15 and about 50° C., e.g. at about 15, 20, 25, 30, 35, 40, 45 or 50° C. In some instances, however, the non-aqueous medium may have a higher melting point, e.g. over about 50° C., or over about 60, 80, 100, 120, 140, 160, 180 or 200° C. At least in the event that the non-aqueous medium has a melting point above 100° C., it is preferred that it be water miscible and that separation of water from the mixture of water, non-aqueous medium and particles be achieved by evaporation of water therefrom. The term "non-aqueous" indicates that the medium is not water. It may comprise small amounts of water, e.g. less than about 10% by weight, or less than about 5, 2 or 1% by weight, or it may be entirely free of water.

The non-aqueous medium may be miscible with water or may be immiscible with water. It will be understood that it is very rare for any substance to be entirely immiscible with water: even very hydrophobic substances may contain a measurable amount of water at equilibrium. However in the present context the terms "miscible" and "immiscible" should be taken to refer to miscibility in the ratio in which the two media (water and the non-aqueous medium) are used in the invention. Thus step a) of the method involves combining a dispersion of said particles in water with the non-aqueous medium to provide a mixture. In this context therefore, "miscible" indicates that water and the non-aqueous medium are completely miscible (i.e. form a single phase) in the proportions in which they are used in step a), and "immiscible" indicates that they are not completely miscible in the proportions in which they are used in step a). This ratio (water/non-aqueous medium) may for example be (on a volume basis) from about 0.1 to about 10, or about 0.1 to 5, 0.1 to 2, 0.1 to 1, 0.1 to 0.5, 0.1 to 0.2, 0.2 to 10, 0.5 to 10, 1 to 10, 2 to 10, 5 to 10, 0.2 to 5, 0.5 to 2, 0.2 to 1, 0.5 to 1, 1 to 10 or 1 to 5, e.g. about 0.1, 0.2, 0.3, 0.4, 0.5, 0.6, 0.7, 0.8, 0.9, 1, 1.5, 2, 2.5, 3, 3.5, 4, 4.5, 5, 6, 7, 8, 9 or 10. In the present specification, the term "miscible" should be taken to include "soluble" and similarly "immiscible" to include "insoluble" in the event that the non-aqueous medium is a solid at the temperature where the miscibility is assessed.

A higher ratio of aqueous dispersion (i.e. the dispersion of the laminae in water) to non-aqueous medium may be used in order to concentrate the particles in the non-aqueous medium. Thus for example if a ratio of aqueous dispersion to non-aqueous medium of 2:1 is used, then (provided essentially all particles are transferred), the resulting dispersion in the non-aqueous medium would be approximately twice the concentration of particles than the starting aqueous dispersion.

Step a) of the method may be conducted at any suitable temperature, depending on the specifics of the case. For example, lower temperatures may be used in order to improve stability, reduce aggregation etc. whereas higher temperatures may be used in order to reduce viscosity and/or to ensure that the non-aqueous medium is in its liquid state. The effect on miscibility of water and the non-aqueous medium should also be considered when determining the optimum temperature. Suitable temperatures are commonly from about 0 to about 50° C., or 0 to 30, 0 to 20, 0 to 10, 10 to 50, 20 to 50, 10 to 30 or 20 to 40° C., e.g. about 0, 5, 10, 15, 20, 25, 30, 35, 40, 45 or 50° C., however higher temperatures may at times be used. The temperature should be at or above the melting point of the non-aqueous medium.

Suitable water miscible non-aqueous media include reactive compounds that may be used in the manufacture of polymeric materials. These include diamino and polyamino compounds and prepolymers such as those which may be used in the manufacture of polyurethanes, polyamides, epoxy polymers etc. Suitable such compounds include tetramethylenediamine and hexamethylenediamine. Other suitable water miscible non-aqueous media include high boiling polar aprotic solvents such as ionic media, hexamethylphosphorus triamine and hexamethyl phosphoramide (HMPT and HMPA), dimethyl sulfoxide, dimethyl acetamide, dimethyl formamide, N-methylpyrrolidone (NMP), N-methylmorpholine-N-oxide etc., as well as high boiling alcohols such as benzyl alcohol, glycol ethers such as diethylene glycol, diethylene glycol monoethyl ether etc.

Suitable water immiscible non-aqueous media include hydrocarbons, commonly aromatic hydrocarbons, having boiling points above about 110° C., or about 120, 125, 130, 135, 140, 145 or 150° C. Others include halogenated hydrocarbons, e.g. chlorinated or brominated hydrocarbons. These may be monohalogenated or dihalogenated or may have more than 2 (e.g. 3, 4, 5 or 6) halogen atoms per molecule. In the event that the halogenated hydrocarbon has more than one halogen atom per molecule, all of the halogen atoms may be the same, or one or more may be different. The halogenated hydrocarbons may be aromatic or may be aliphatic. Examples include dibromodichloromethane, bromochlorobenzene, tetrachloromethane, chloroform, dichloromethane, chlorobenzene, dichlorobenzene, dichloroethane, benzyl chloride, chlorotoluene etc.

Where mention is made herein of "water" it should be understood that the water may not be pure. It may comprise dissolved materials. These may be salts, or they may be dissolved gases or they may be surfactants or they may be some other type of solute. There may be more than one type of dissolved material in the water. In some embodiments the water of the dispersion of step a) of the method does not have any organic solvent dissolved therein.

The dispersion of the particles in water may have a content of laminae of at least about 0.01%, or of at least about 0.02, 0.05, 0.1, 0.2, 0.5, 1, 2, 5 or 10%, or from about 0.01 to about 20%, or about 0.01 to 10, 0.01 to 1, 0.05 to 20, 0.05 to 10, 0.05 to 1, 0.1 to 20, 0.1 to 10, 0.1 to 5, 0.1 to 1, 0.1 to 1, 0.1 to 0.5, 0.5 to 20, 1 to 20, 2 to 20, 5 to 20, 10 to 20, 0.5 to 5, 1 to 10, 1 to 5 or 5 to 10%, e.g. about 0.01, 0.02, 0.03, 0.04, 0.05, 0.06, 0.07, 0.08, 0.09, 0.1, 0.2, 0.3, 0.4, 0.5, 1, 2, 3, 4, 5, 6, 7, 8, 9, 10, 11, 12, 13, 14, 15, 16, 17, 18, 19 or 20%. The resulting dispersion of the particles in the non-aqueous medium may be at least about 0.01%, or of at least about 0.02, 0.05, 0.1, 0.2, 0.5, 1, 2, 5 or 10%, or from about 0.01 to about 20%, or about 0.01 to 10, 0.01 to 1, 0.05 to 20, 0.05 to 10, 0.05 to 1, 0.1 to 20, 0.1 to 10, 0.1 to 5, 0.1 to 1, 0.1 to 1, 0.1 to 0.5, 0.5 to 20, 1 to 20, 2 to 20, 5 to 20, 10 to 20, 0.5 to 5, 1 to 10, 1 to 5 or 5 to 10%, e.g. about 0.01, 0.02, 0.03, 0.04, 0.05, 0.06, 0.07, 0.08, 0.09, 0.1, 0.2, 0.3, 0.4, 0.5, 1, 2, 3, 4, 5, 6, 7, 8, 9, 10, 11, 12, 13, 14, 15, 16, 17, 18, 19 or 20%. These concentrations may be on a w/w or w/v basis.

Commonly the dispersion of particles in water is stabilised by the presence of a surfactant. The surfactant is preferably present as a complete monolayer on the surface of the particles. The monolayer of surfactant may persist on the surfactant of the particles through the method so that the particles in the non-aqueous medium also have a monolayer of the surfactant on the surface thereof. The surfactant may be the dispersant as hereinbefore described. The surfactant may be a component of the dispersant as hereinbefore described. The dispersant as hereinbefore described may be a component of the surfactant. The surfactant may be separate to the dispersant as hereinbefore described.

The surfactant may be polymeric. The surfactant may be a non-ionic surfactant. It may be a copolymer of ethylene oxide and propylene oxide. It may have a $d\gamma/dc$ (rate of change of surface tension with change in concentration) value in water of less than about $0$ $Nm^{-1} \cdot mol^{-1} \cdot L$, or may be from about $-0.1$ to about $-5$ $Nm^{-1} \cdot mol^{-1} \cdot L$. The cmc (critical micelle concentration) of the surfactant may be greater than about 1 mM, or greater than about 1.5, 2, 2.5 or 3 mM, or may be about 1 to about 5 mM, or about 1 to 3, 1 to 4, 1.5 to 5, 2 to 5, 1.5 to 3 or 2 to 4 mM, e.g. about 0.5, 1, 1.5, 2, 2.5, 3, 3.5, 4, 4.5 or 5 mM.

If the surfactant is polymeric it may have a molecular weight (number average or weight average) of about 500 to about 50000, or about 500 to 10000, 500 to 5000, 500 to 1000, 1000 to 50000, 10000 to 50000, 1000 to 10000, 1000 to 5000 or 5000 to 10000, e.g. about 500, 600, 700, 800, 900, 1000, 1500, 2000, 2500, 3000, 3500, 4000, 4500, 5000, 6000, 7000, 8000, 9000, 10000, 15000, 20000, 25000, 30000, 35000, 40000, 45000 or 50000. It may have a narrow molecular weight range or a broad molecular weight range. The ratio Mw/Mn may be greater than about 1.1, or greater than about 1.2, 1.3, 1.4, 1.5, 2, 3, 4 or 5, or it may be less than about 5, or less than about 4, 3, 2, 1.5 or 1.2. It may for example be about 1.1, 1.2, 1.3, 1.4, 1.5, 2, 2.5, 3, 3.5, 4, 4.5 or 5. It may have a degree of polymerisation of about 10 to about 1000, or about 10 to 500, 10 to 200, 10 to 100, 10 to 50, 20 to 1000, 50 to 1000, 100 to 1000, 500 to 1000, 20 to 200, 20 to 100 or 100 to 200, e.g. about 10, 15, 20, 25, 30, 35, 40, 45, 50, 60, 70, 80, 90, 100, 150, 200, 250, 300, 350, 400, 450, 500, 600, 700, 800, 900 or 1000. Mixtures of surfactants may be used. In this case, at least one of the surfactants, optionally all, of the surfactants may be as described above.

The surfactant may be a copolymer. It may be an ethylene oxide-propylene oxide copolymer. It may have other comonomers or may have no other comonomers. It may be an amine having one or more (optionally 3) ethylene oxide-propylene oxide copolymer substituents on the nitrogen atom. It may be a block copolymer. It may be a triblock copolymer. It may be an ethylene oxide-propylene oxide block copolymer. It may be a poloxamer. It may be an ethylene oxide-propylene oxide-ethylene oxide triblock copolymer. The two ethylene oxide blocks may be the same length or may be different lengths. The proportion of ethylene oxide in the polymer may be about 10 to about 90% by weight or mole, or about 10 to 50, 10 to 30, 50 to 90, 70 to 90, 20 to 80, 20 to 50, 50 to 80, 20 to 40 or 60 to 80%, e.g. about 10, 20, 30, 40, 50, 60, 70, 80 or 90%.

The surfactant may have an HLB (hydrophilic/lipophilic balance) of greater than about 6, or greater than about 7, 8, 10, 12, 15 or 20, or of about 6, 7, 8, 9, 10, 11, 12, 13, 14, 15, 16, 17, 18, 19, 20, 21, 22, 23, 24 or greater than 24. Suitable surfactants which may be used in the present invention include Pluronic® P123 (nominally $HO(CH_2CH_2O)_{20}(CH_2CH(CH_3)O)_{70}(CH_2CH_2O)_{20}H$: HLB about 7), Pluronic® L31 (nominally $HO(CH_2CH_2O)_2(CH_2CH(CH_3)O)_{16}(CH_2CH_2O)_2H$: HLB about 1-7), Pluronic® F127 (nominally $HO(CH_2CH_2O)_{101}(CH_2CH(CH_3)O)_{56}(CH_2CH_2O)_{101}H$; HLB about 22) and Pluronic® F108 $HO(C_2H_4O)_{141}(C_3H_6O)_{44}(C_2H_4O)_{141}H$: (nominally HLB>24) and amino functional polyethers (for example those sold under the trade name Jeffamine®). In general, surfactants having higher HLB also have higher cloud point. Commonly surfactants with HLB over about 12 have a cloud point over about 100° C. In preferred embodiments therefore, the HLB of the surfactant may be over 12. The surfactant may have a cloud point over 100° C., or over about 110, 120, 130, 140 or 150° C. In general, a higher HLB is preferable so as to better stabilise the dispersion. The surfactant may be a non-foaming surfactant.

In some instances a salt may be present in the water. This may facilitate extraction into the non-aqueous medium. It may do so by increasing the hydrophobicity of the surfactant by complexing therewith or otherwise binding thereto. The salt may be added, either before or after combining the aqueous dispersion with the non-aqueous medium. The salt should be one that is capable of complexing with or otherwise binding to the halogenated compound. Commonly the salt is one having a multivalent (i.e. not monovalent, for example 2+, 3+ or 4+) cation. Suitable salts therefore include iron salts such as $Fe^{3+}$, e.g. ferric chloride or ferric bromide, and $La^{3+}$ salts. Other complexing salts such as $Fe(SCN)^{2+}$, which can interact with the PEO chains of certain surfactants, may also be used. These are convenient as it is possible to determine their concentration colorimetrically in the non-aqueous phase. Suitable concentrations in the water are from about 0.01 to 0.5M, or about 0.05 to 0.5, 0.1 to 0.5, 0.1 to 0.5 or 0.05 to 0.2M, e.g. about 0.01, 0.02, 0.03, 0.04, 0.05, 0.06, 0.07, 0.08, 0.09, 0.1, 0.15, 0.2, 0.25, 0.3, 0.35, 0.4, 0.45 or 0.5M.

The removal of the water may be partial removal or may be total removal. In some instances, as will be described below in greater detail, the majority of the water is removed in an initial step and a subsequent drying step removes most or all of the residual water. The initial water removal step may for example remove at least about 90% of the water, or at least about 95, 96, 97, 98, 99 or 99.5% thereof. The degree of removal at this stage will depend on the nature of the non-aqueous medium and on the method of its removal.

The step of removing the water may be conducted by physical separation of two immiscible media or it may be conducted by evaporation of the water, or it may be conducted by freeze-drying, or it may be conducted by some other suitable method. The precise method of removing the water may depend on the nature of the non-aqueous medium.

In particular, if the non-aqueous medium is water miscible, the mixture formed in step a) of the method will have only a single medium phase (although it will also contain the dispersed particles as a solid phase). In this case a suitable method for removal of the water is by evaporation. Most commonly this will involve heating the mixture to the point where water evaporates or boils. In general, this will also require that the non-aqueous medium has a vapour pressure of the medium is lower than that of water. The non-aqueous medium may have a vapour pressure at 100° C. of less than about 90 kPa, or less than about 80, 70, 60, 50, 40, 30, 20 or 10 kPa, or may have a vapour pressure at 100° C. of about 90 kPa, or about 80, 70, 60, 50, 40, 30, 20 or 10 kPa. It may have a boiling point (at normal atmospheric pressure) of at least about 110, or at least about 120, 130, 140 or 150° C. In some instances it may have no measurable boiling point (i.e. it may decompose before a boiling point is reached).

The process described above may be considered to represent a fractional distillation of the mixture in order to remove the water but retain the majority (commonly at least about 60%, or at least about 70, 80 or 90%) of the non-aqueous medium. As noted above, in this instance, it is preferred that if a surfactant is present it should have a cloud point above 100° C., or above the temperature at which the water removal is conducted. The removal of the water may be facilitated by conducting step b) at reduced pressure, e.g. at below about 50 kPa absolute, or below about 40, 30, 20, 10, 5, 2 or 1 kPa, or between about 0.1 and about 50 kPa, or between about 0.1 and 20, 0.1 and 10, 0.1 and 5, 0.1 and 1, 1 and 50, 5 and 50, 10 and 50, 20 and 50, 10 and 20 or 1 and 10 kPa, e.g. at about 0.1, 0.2, 0.3, 0.4, 0.5, 0.6, 0.7, 0.8, 0.9, 1, 2, 3, 4, 5, 10, 15, 20, 25, 30, 35, 40, 45 or 50 kPa. The use of sub-atmospheric pressure enables the water removal to be conducted at a lower temperature than would be the case at atmospheric temperature. The removal may be additionally or alternatively facilitated by passing a gas through the mixture, commonly in the form of finely divided bubbles (e.g. by means of a frit or similar device). It is known that certain organic media can azeotrope with water, and this phenomenon may be used to reduce the temperature at which the water removal is conducted. For example, toluene can form an azeotrope with water which boils at around 84° C. Therefore addition of a suitable amount of toluene can allow the water to be removed by heating to about 84° C. (at 1 atmosphere pressure) whereas in the absence of toluene the boiling point of water is 100° C. (at 1 atmosphere). The water/toluene azeotrope contains about 80% toluene by weight, so in this example, it would be necessary to add toluene at up to about 4 times the weight of water.

If the non-aqueous medium is not water miscible, the water may also be removed by evaporation/boiling as described above, provided that the vapour pressure of the non-aqueous medium is higher than that of water. It should be noted that, as mentioned above, certain media azeotrope with water. Therefore if the non-aqueous medium itself forms an azeotrope with water, removal of water may be achieved in the event that the non-aqueous medium is itself more volatile than water (whether or not it is water miscible). For example carbon tetrachloride, which is not water miscible and is more volatile than water, has an azeotrope with water that boils at about 67° C., approximately 10° C. below the boiling point of pure carbon tetrachloride. Therefore water may be removed from this quite volatile solvent by evaporation of the azeotrope. Similarly, n-propanol, which is water miscible and is more volatile than water, has an azeotrope with water that boils at about 88° C., approximately 9° C. below the boiling point of pure n-propanol. Therefore water may be removed from this quite volatile solvent by evaporation of the azeotrope.

An alternative way to remove water from a non-aqueous medium that is immiscible with water is to simply separate the two media physically. Thus for example chlorobenzene is an example of a non-aqueous medium which is immiscible with water. It has a density of about 10% higher than that of water. Therefore a mixture of chlorobenzene and water will tend to separate such that the water is the upper layer and the chlorobenzene is the lower layer. These may be separated by allowing the lower layer to drain off, or by decanting the top layer, or by some similar method. The separation of two immiscible media may be facilitated by centrifugation. In this event, the outer medium will be the more dense, and may be separated by allowing it to exit the centrifuge. In a particular example of this, if the non-aqueous medium has a melting point between about 5 and about 100° C., the dispersion of particles in water and the non-aqueous medium may be agitated above the melting point of the non-aqueous medium, and the temperature may then be reduced to below said melting point so as to cause the non-aqueous medium, now having the particles dispersed therethrough, to solidify. The water may then be removed by simply decanting, or by filtering, or by some other suitable method for solid-liquid separation.

Suitable water immiscible non-aqueous media include halogenated compounds (such as halogenated solvents), e.g. chlorinated compounds.

Once the water has been removed from the mixture, the resulting dispersion of the laminae in the non-aqueous medium may be dried. This is because the initial removal of water may be incomplete, and may therefore leave residual water in the dispersion. For example, it is generally difficult to remove all traces of water from a water miscible medium simply by fractional distillation of the water. Suitable processes for drying include adding an azeotroping medium and azeotroping off the residual water, e.g. using a Dean-Stark separator or other suitable device. Alternatively or additionally, water may be removed by use of a drying agent, e.g. a zeolite, an anhydrous salt, a water-reactive substance (e.g. sodium metal) or other suitable drying agent. The skilled person will readily understand which of these methods is appropriate for a particular instance (for example, use of sodium metal would be inappropriate when the non-aqueous medium is a protic medium such as an alcohol).

As discussed above, the laminae may be obtained by exfoliation, in particular in water. This may comprise ultrasonicating a precursor laminar material (e.g. graphite, mica etc.) in water. This is preferably conducted in the presence of surfactant, in such a way that at all stages of the ultrasonication the concentration of surfactant is sufficient to form a complete monolayer on the various particles (laminar and exfoliated laminae) in the dispersion. This process is discussed in detail in WO2013/010211. In one option, the initial surfactant concentration in the mixture is sufficient that, once the laminar material is exfoliated, it is sufficient to form a monolayer on the exfoliated particles formed during the subsequent ultrasonication. In another option, the initial surfactant concentration in the mixture is sufficient to form a monolayer on the initial laminar particles and further surfactant is added, either continuously or batchwise, during the sonication in order to ensure that at all times during the ultrasonication the surfactant level is sufficient to form a complete monolayer on all particles in the dispersion. It should be noted that as exfoliation proceeds, the total surface area increases and therefore more surfactant is required in order to form a monolayer on all particles in the dispersion.

In the first option, described above, the initial surfactant concentration may be readily determined from the calculated surface area of the exfoliated laminae and the known area per molecule of the surfactant. The latter may be obtained from readily available literature sources or may be measured experimentally for example using Langmuir-Blodgett apparatus. In the second option, described above, a suitable method for determining the rate of addition of surfactant is as follows.

1. The surface tension of the liquid phase (water) is measured as a function of concentration of surfactant and the concentration region identified corresponding to the surface tension of between a lower value (C1) and an expected threshold value (C2e, commonly corresponding to surface tension above about 48-50 mJ/m$^2$).

2. Surfactant is first added to a dispersion of laminar material to produce a liquid of about concentration C1.

3. Sonication of the dispersion is commenced and samples are removed at regular time intervals. The surface tension of the liquid phase is determined as a function of time from commencement of sonication.

4. A calibration curve (see for example FIG. 3) is produced form the data obtained in step 3, which shows the surface tension of the solution as a result of surfactant consumed through adsorption to the exfoliated material as a function of time.

5. The time (T1) at which exfoliation ceases can be determined by observing plateauing of the surface tension/time curve from step 4. The concentration at that time is the threshold value C2.

6. Surfactant is replaced at the minimum rate of consumption. (C1–C2)/T1.

Commonly the lower value C1 is less than about 45 mJ/m$^2$, or less than about 44, 43, 42, 41 or 4045 mJ/m$^2$, or about 35 to about 45 mJ/m$^2$, or about 38 to 45, 40 to 45, 35 to 43, 35 to 40, 38 to 42 or 40 to 42 mJ/m$^2$, e.g. about 35, 36, 37, 38, 39, 40, 41, 42, 43, 44 or 45 mJ/m$^2$. The threshold value (C2e, C2) is commonly above 45 mJ/m$^2$, or above 46, 47, 48, 49 or 50, or between about 45 and 55, or about 45 to 50, 50 to 55, 48 to 52 to 47 to 40, e.g. about 45, 46, 47, 48, 49, 50, 51, 52, 53, 54 or 55 mJ/m$^2$.

The ultrasonication may have a power of greater than about 10 W, or greater than about 20, 50, 100, 200, 500, 1000, 2000, 3000 or 4000 W, or may be about 10 to about 1000 W, or about 10 to 500, 10 to 200, 10 to 100, 10 to 50, 50 to 1000, 50 to 100, 100 to 1000, 200 to 1000, 500 to 1000, 1000 to 5000, 1000 to 4000, 200 to 5000, 100 to 500, 300 to 700 or 500 to 800 W, e.g. about 10, 20, 30, 40, 50, 60, 70, 80, 90, 100, 150, 200, 250, 300, 350, 400, 450, 500, 600, 700, 800, 900, 1000, 1500, 2000, 2500, 3000, 3500, 4000, 4500 or 5000 W. It may have a frequency of greater than about 2 kHz, or greater than about 5, 10, 20, 50, 100, 150 or 200 kHz, or about 2 to about 200 kHz, or about 2 to 100, 2 to 50, 2 to 20, 2 to 10, 10 to 200, 20 to 200, 50 to 200, 100 to 200, 10 to 100, 50 to 100 or 10 to 50 kHz, e.g. about 2, 3, 4, 5, 6, 7, 8, 9, 10, 15, 20, 25, 30, 35, 40, 45, 50, 60, 70, 80, 90, 100, 120, 140, 160, 180 or 200 kHz. A suitable ultrasonication condition may be for example about 50-100 W at about 10 to 50 kHz. The ultrasonication may be continued for sufficient time to achieve the desired degree of exfoliation. A suitable time may be for example at least about 0.5 minutes, or at least about 1, 2, 5, 10, 15, 20, 30, 40, 50 to 60 minutes, or about 0.5 to about 60 minutes, or about 0.5 to 30, 0.5 to 10, 0.5 to 2, 0.5 to 1, 1 to 60, 2 to 60, 5 to 60, 10 to 60, 30 to 60, 1 to 30, 1 to 10, 1 to 5, 5 to 30, 10 to 30, 10 to 20 or 5 to 15 minutes, e.g. about 0.5, 1, 2, 3, 4, 5, 10, 15, 20, 25, 30, 35, 40, 45, 50, 55 or 60 minutes. It may be less than about 30 minutes, or less than about 25, 20 or 15 minutes. In some instances ultrasonication itself may provide the agitation required to prepare a dispersion and no separate agitation may be required.

Reactive amine groups may be amine groups capable of reacting with some other functional group in order to couple to another molecule. These may be primary amines or may be secondary amines. For example reactive amines may be used as non-aqueous media so as to produce a dispersion of graphene therein. This may then be used in manufacture of a polyurethane, epoxy resin, polyamide, polyimide or other suitable polymer system, filled with the graphene. Thus a specific example might involve making a polymer composite, by preparing a dispersion of laminae in a non-aqueous medium by the method described herein in which the non-aqueous medium comprising at least two amine groups per molecule, combining the resulting dispersion with a reagent comprising at least two amine-reactive groups (i.e. groups capable of reacting with the amine groups) per molecule, and allowing the non-aqueous medium to react with the reagent so as to form a polymer composite comprising the laminae dispersed in a reaction product of the non-aqueous medium and the reagent. Amine-reactive groups as described above may be for example epoxy groups (so as to make an epoxy resin), isocyanate groups (so as to make a polyurethane), a cyclic anhydride (so as to make a polyimide), an acid or acid halide (so as to make a polyamide) etc.

It will be understood that the above example may be extended to other laminae (as described elsewhere herein) and to reactive media other than diamines. Thus more broadly a medium having at least two reactive functional groups per molecule can be used to make a dispersion of laminae, and that may be reacted with a reagent having at least two complementary reactive functional groups per molecule to form a composite material. In this case, the complementary reactive functional groups are groups that are capable of reacting (e.g. condensing) with the reactive functional groups.

EXAMPLES

Example 1. Aqueous Based Traction Drive Fluid

Graphene was exfoliated from graphite using the method described in WO2013/010211. 20 g of flake graphite with a mean particle size diameter of approximately 2 mm was added to 1 L water to give a concentration of 2% w/w. To this suspension, 1 g of solid Pluronic® F108 was added. Pluronic® F108 is poly(ethylene glycol)-block-poly(propylene glycol)-block-poly(ethylene glycol) [CAS Number 9003-11-6] of approximate formula (ethylene oxide)$_{130}$(propylene oxide)$_{50}$(ethylene oxide)$_{130}$. The combined suspension was sonicated continuously using a Qsonica® Q700 sonicator with a solid sonitrode probe at a power of 160 W. The suspension chamber was maintained at a temperature of 25° C. throughout using a chilling recirculation unit. After an initial 10 minutes of sonication, an aqueous Pluronic® F108 solution with a concentration of 10% w/w was added dropwise at a rate of 100 mL/hour to the suspension. The sonication was ceased after 10 hours upon which the suspension volume was reduced to 500 mL (a factor of 4) through heating at 80° C. Once reduced, the suspension was cooled and transferred to centrifuge tubes. Any large and non-exfoliated particles were sedimented through centrifugation at 3000 rpm for 15 minutes. The supernatant was subsequently collected. This lead to a high degree of exfoliation of the graphite to give graphene with thin sheets with a concentration of 1.05% w/w. Whilst this method was used to produce the graphene, in principle any graphene-like material can be used as the source with subsequent surface modification using a dispersant. The graphene suspension was diluted to a concentration of 0.5% w/w, and 0.1% w/w of Dow Corning Antifoam B Emulsion was then added to reduce foaming, a necessary requirement for traction fluids where the shear forces associated with the drive and driven elements can induce significant aeration of the fluid and cause uneven lubrication in use.

This fluid was used as the lubricant within a mini-traction machine consisting of a rotating ball on rotating disk (see FIG. 3 with associated brief description of drawings) in order to determine the traction coefficient of the fluid. Parameters that were varied included load (contact pressure), speed and the temperature of the fluid. Typically, the traction coefficient was determined over a broad slide to roll ratio (SRR) range as shown in FIG. 4. The influence of speed on the traction coefficient is shown in FIG. 5, for graphene concentrations within the carrier fluid of 0.5% w/w at a load of 5N. At a constant speed, the influence on applied load was probed with the data shown in FIG. 6. Similarly, the traction coefficient of the fluid was measured at constant speed and load with varying temperature as shown in FIG. 7.

Example 2: Graphene in Tetraethylene Glycol Carrier Fluid

Graphene was exfoliated from graphite using the method described in WO2013/010211. 20 g of flake graphite with a mean particle diameter of approximately 2 mm was added to 1 L water to give a concentration of 2% w/w. To this suspension, 1 g of solid Pluronic® F108 was added. The combined suspension was sonicated continuously using a Qsonica® Q700 sonicator with a solid sonitrode probe at a power of 160 W. The suspension chamber was maintained at a temperature of 25° C. throughout using a chilling recirculation unit. After an initial 10 minutes of sonication, an aqueous Pluronic® F108 solution with a concentration of 10% w/w was added dropwise at a rate of 100 mL/hour to the suspension. The sonication was ceased after 10 hours upon which the suspension volume was reduced to 500 mL (a factor of 4) through heating at 80° C. Once reduced, the suspension was cooled and transferred to centrifuge tubes. Any large and non-exfoliated particles were sedimented through centrifugation at 3000 rpm for 15 minutes. The supernatant was subsequently collected. The suspension was then frozen at −60° C. and then dried at a pressure of 5 Pa within a freeze dryer to remove all water. The graphene powder with Pluronic® F108 surfactant (0.1 g of graphene, 0.9 g of F108) was then dispersed in 20 g tetraethylene glycol using ultrasonication with a power of 70 W for 5 minutes. This produced a homogenously dispersed suspension of graphene in tetraethylene glycol with a concentration of 0.5% w/w.

This fluid was used as the lubricant within a mini-traction machine consisting of a rotating ball on rotating disk in order to determine the traction coefficient of the fluid. FIG. 8 shows an example of the traction coefficient measured at a load (contact pressure) of 45N and speed of 200 mm/s across a wide SRR range demonstrating the ability of the formulation to effectively transmit torque.

Example 3: Graphene in Propylene Glycol/Tetraethylene Glycol Carrier Fluid

Graphene was exfoliated from graphite using the method described in WO2013/010211. 20 g of flake graphite with a mean particle diameter of approximately 2 mm was added to 1 L water to give a concentration of 2% w/w. To this suspension, 1 g of solid Pluronic® F108 was added. The combined suspension was sonicated continuously using a Qsonica® Q700 sonicator with a solid sonitrode probe at a power of 160 W. The suspension chamber was maintained at a temperature of 25° C. throughout using a chilling recirculation unit. After an initial 10 minutes of sonication, an aqueous Pluronic® F108 solution with a concentration of 10% w/w was added dropwise at a rate of 100 mL/hour to the suspension. The sonication was ceased after 10 hours upon which the suspension volume was reduced to 500 mL (a factor of 4) through heating at 80° C. Once reduced, the suspension was cooled and transferred to centrifuge tubes. Any large and non-exfoliated particles were sedimented through centrifugation at 3000 rpm for 15 minutes. The supernatant was subsequently collected. The suspension was then frozen at −60° C. and then dried at a pressure of 5 Pa within a freeze dryer to remove all water. The graphene powder with Pluronic® F108 surfactant was then dispersed in a tetraethylene glycol-propylene glycol mixture (with mass ratio 85:15) using ultrasonication with a power of 70 W for 5 minutes. The final concentration of graphene was 0.5% w/w.

This fluid was used as the lubricant within a mini-traction machine consisting of a rotating ball on rotating disk in order to determine the traction coefficient of the fluid. Parameters that were varied included load (contact pressure), slide to roll ratio, speed and temperature of the fluid. The traction coefficient of the fluid was measured at constant speed and load (contact pressure) with varying temperature as shown in FIG. 9.

Example 4: $MoS_2$ in Water-Ethylene Glycol Carrier Fluid

Single and few layer $MoS_2$ was exfoliated from bulk $MoS_2$ powder using the method described in WO2013/010211. 20 g of $MoS_2$ with a mean particle diameter of approximately 200 µm was added to 1 L water to give a concentration of 2% w/w. To this suspension, 1 g of solid Pluronic® F108 was added. The combined suspension was sonicated continuously using a Qsonica® Q700 sonicator with a solid sonitrode probe at a power of 160 W. The suspension chamber was maintained at a temperature of 25° C. throughout using a chilling recirculation unit. After an initial 10 minutes of sonication, an aqueous Pluronic® F108 solution with a concentration of 10% w/w was added dropwise at a rate of 100 mL/hour to the suspension. The sonication was ceased after 10 hours upon which the suspension volume was reduced to 500 mL (a factor of 4) through heating at 80° C. Once reduced, the suspension was cooled and transferred to centrifuge tubes. Any large and non-exfoliated particles were sedimented through centrifugation at 3000 rpm for 15 minutes. The supernatant was subsequently collected. This suspension was diluted to concentration of 5 mg/mL or 0.5% w/w and was mixed together with ethylene glycol using a vortex stirrer to give a mass ratio of water:ethylene glycol of 95:5. This fluid was used as the lubricant within a mini-traction machine consisting of a rotating ball on rotating disk in order to determine the traction coefficient of the fluid. Parameters that were varied included load (contact pressure), slide to roll ratio, speed and temperature of the fluid. FIG. 10 shows the traction coefficient across the SRR range of −200% to 200% for an applied load of 10N at a speed of 100 mm/s at 25° C.

The invention claimed is:

1. A method for transferring torque from a drive element to a driven element in a traction drive, comprising disposing a traction drive fluid between the drive element and the driven element, and rotating the drive element,
   whereby rotation of the drive element causes rotation of the driven element,
   wherein the traction drive fluid comprises:
      a carrier having a boiling point of at least about 100° C. and a melting point of below about 10° C., both being measured at 1 atm pressure; and
      a particulate solid consisting of a plurality of laminae, wherein
      the laminae comprise particles formed from a number of sheets of lamina material;
      the particles have a mean aspect ratio of at least 20; and
      the average number of individual sheets in each particle is from about 1 sheet to about 100 sheets, wherein the laminae are homogeneously distributed through said carrier;

wherein the proportion of the particulate solid in the traction drive fluid is from about 0.05% to about 10% w/w; and wherein the traction drive fluid has a traction coefficient of greater than about 0.05 at 25° C., measured at 0.8 GPa contact pressure, 100 mms$^{-1}$ speed, and 10% slide to roll ratio.

2. A traction drive comprising:

a drive element;

a driven element; and a traction drive fluid, wherein the traction drive fluid is disposed between said drive element and said driven element, wherein the traction drive fluid comprises:

a carrier having a boiling point of at least about 100° C. and a melting point of below about 10° C., both being measured at 1 atm pressure; and a particulate solid consisting of a plurality of laminae, wherein the laminae comprise particles formed from a number of sheets of lamina material;

the particles have a mean aspect ratio of at least 20; and the average number of individual sheets in each particle is from about 1 sheet to about 100 sheets, wherein the laminae are homogeneously distributed through said carrier;

wherein the proportion of the particulate solid in the traction drive fluid is from about 0.05% to about 10% w/w; and wherein the traction drive fluid has a traction coefficient of greater than about 0.05 at 25° C., measured at 0.8 GPa contact pressure, 100 mms$^{-1}$ speed, and 10% slide to roll ratio.

3. The traction drive according to claim 2, wherein the carrier has a boiling point of at least about 200° C., measured at 1 atm pressure.

4. The traction drive according to claim 2, wherein the traction drive fluid further comprises a corrosion inhibitor, an antimicrobial agent, an antioxidant, a wear inhibitor, a pour point depressant, a metal deactivator, an extreme pressure agent, an antifoam agent, a friction modifier, or a viscosity index improver.

5. The traction drive according to claim 2, wherein the traction drive fluid further comprises a dispersant.

6. The traction drive according to claim 5, wherein the dispersant is a polyether, a polyetheramine, an ethoxylated Bisphenol A, an ethoxylated acrylate, a poloxamer, a polyalkylene glycol, or a mixture of any two or more of these.

7. The traction drive according to claim 2, wherein the laminae have average thickness of less than about 50 nm.

8. The traction drive according to claim 2, wherein the laminae comprise graphene.

9. The traction drive according to claim 2, wherein the traction drive fluid has a pour point of less than about 10° C., measured according to ASTM D 97-16.

10. The method according to claim 1, wherein the carrier has a boiling point of at least about 200° C., measured at 1 atm pressure.

11. The method according to claim 1, wherein the traction drive fluid further comprises a corrosion inhibitor, an antimicrobial agent, an antioxidant, a wear inhibitor, a pour point depressant, a metal deactivator, an extreme pressure agent, an antifoam agent, a friction modifier, or a viscosity index improver.

12. The method according to claim 1, wherein the traction drive fluid further comprises a dispersant.

\* \* \* \* \*